United States Patent
Andersson et al.

(10) Patent No.: US 11,451,333 B2
(45) Date of Patent: Sep. 20, 2022

(54) TBS DETERMINATION WITH MULTIPLE BASE GRAPHS

(71) Applicant: TELEFONAKTIEBOLAGET L M ERICSSON (PUBL), Stockholm (SE)

(72) Inventors: Mattias Andersson, Sundbyberg (SE); Yufei Blankenship, Kildeer, IL (US); Sara Sandberg, Luleå (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 202 days.

(21) Appl. No.: 16/082,875

(22) PCT Filed: May 10, 2018

(86) PCT No.: PCT/IB2018/053263
§ 371 (c)(1),
(2) Date: Sep. 6, 2018

(87) PCT Pub. No.: WO2019/069147
PCT Pub. Date: Apr. 11, 2019

(65) Prior Publication Data
US 2021/0184793 A1 Jun. 17, 2021

Related U.S. Application Data

(60) Provisional application No. 62/567,638, filed on Oct. 3, 2017.

(51) Int. Cl.
*H04L 1/18* (2006.01)
*H04L 1/00* (2006.01)
*H04W 72/04* (2009.01)

(52) U.S. Cl.
CPC .......... *H04L 1/0058* (2013.01); *H04L 1/0004* (2013.01); *H04L 1/0061* (2013.01); *H04W 72/042* (2013.01)

(58) Field of Classification Search
None
See application file for complete search history.

(56) References Cited

U.S. PATENT DOCUMENTS 7,158,493 B1 * 1/2007 Uhlik .................... H04W 48/12
370/320
7,349,371 B2 * 3/2008 Schein ................ H04W 74/006
370/329

(Continued)

FOREIGN PATENT DOCUMENTS

CN 102571266 A 7/2012
CN 105960787 A 9/2016

(Continued)

OTHER PUBLICATIONS

Ericsson, "On MCS/transport Block Size Determination", 3GPP TSG RAN WG1 NR Ad-Hoc#2, R1-1711501, Qingdao, P.R. China, Jun. 27-30, 2017.

(Continued)

*Primary Examiner* — Mujtaba M Chaudry

(57) ABSTRACT

Systems and methods are disclosed herein for determining and using a Transport Block Size (TBS) when two or more Low Density Parity Check (LDPC) base graphs can be used for LPDC coding. In some embodiments, a method comprises determining a Transport Block Size (TBS) for a transport block communicated between a network node and a wireless device via a physical channel transmission using a formula such that code block segmentation of the transport block results in equal sized code blocks independent of which of two different LDPC base graphs is used for the code block segmentation. The method further comprises transmitting or receiving the transport block according to the determined TBS.

17 Claims, 13 Drawing Sheets

A wireless network in accordance with some embodiments

(56) References Cited

U.S. PATENT DOCUMENTS

| | | | |
|---|---|---|---|
| 8,059,210 B2* | 11/2011 | Kim | H04L 12/18 348/725 |
| 2007/0003217 A1* | 1/2007 | Jang | H04H 60/27 386/214 |
| 2007/0207727 A1* | 9/2007 | Song | H04L 12/1877 455/3.06 |
| 2008/0098273 A1* | 4/2008 | Blankenship | H03M 13/05 714/746 |
| 2008/0225799 A1* | 9/2008 | Lee | H04W 36/0007 370/332 |
| 2008/0305792 A1* | 12/2008 | Khetawat | H04W 12/069 455/435.1 |
| 2010/0254449 A1* | 10/2010 | Rusch-Ihwe | H03M 13/2909 375/240.02 |
| 2010/0296506 A1* | 11/2010 | Ryu | H03M 13/2921 370/350 |
| 2011/0299484 A1 | 12/2011 | Nam et al. | |
| 2012/0099446 A1 | 4/2012 | Su et al. | |
| 2015/0085794 A1 | 3/2015 | Chen et al. | |
| 2018/0205497 A1* | 7/2018 | Wang | H03M 13/1102 |
| 2019/0013900 A1* | 1/2019 | Patel | H04L 1/0009 |

FOREIGN PATENT DOCUMENTS

| | | |
|---|---|---|
| CN | 107211234 A | 9/2017 |
| RU | 24945491 A | 9/2013 |
| WO | 2016148454 A1 | 9/2016 |

OTHER PUBLICATIONS

Nokia et al., "Remaining details of CB segmenation", R1-1718675, 3GPP TSG RAN WG1 #Meeting 90bis, Oct. 2, 2017.
ZTE et al., "Considerations on resource allocation issues", R1-1717040, 3GPP TSG RAN WG1 #Meeting 90bis, Oct. 2, 2017.
Ericsson, "TB Size and Code Block Segmentation for NR Data Channel", R1-1717992, G3GPP TSG RAN WG1 #Meeting 90bis, Oct. 2, 2017.
Ericsson "Code Block Segmentation for NR Data Channel," R1-1715735, RAN1 NR Ad Hoc #3, Sep. 18-21, 2017.
5G; NR; Physical layer procedures for data (3GPP TS 38.214 version 15.3.0 Release 15) ETSI TS 138 214 v15.3.0, Oct. 2018.
Ericsson "On TBS Determination and DL/UL Resource Allocation," R1-1719596, 3GPP TSG RAN WG1 Meeting 91, Nov. 27-Dec. 1, 2017.
Mediatek, Inc., "On TBS determination procedure", R1-1800170, 3GPP TSG RAN WG1 Meeting AH-1801, R1-1800170, Jan. 22-26, 2018.
3GPP, "3rd Generation Partnership Project; Technical Specification Group Radio Access Network; NR; Physical layer procedures for data (Release 15)", TS 38.214 V15.3.0, Sep. 2018.
Nokia et al., R1-1716558, "Code segmentation for LDPC", 3GPP TSG RAN WG1 Meeting NR#3, R1-1716558, Nagoya, Japan, Sep. 18-21, 2017.
Qualcomm Incorporated, R1-1713463, "LDPC base graph determination and indication", 3GPP TSG RAN WG1 #90, R1-1713463, Aug. 21-25, 2017, Prague, Czech Republic.

* cited by examiner

Slot
(PRIOR ART)

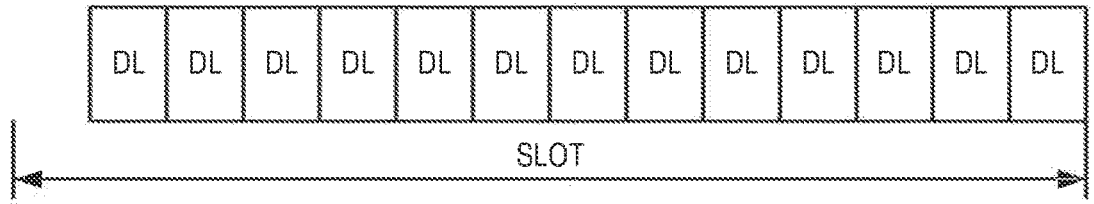
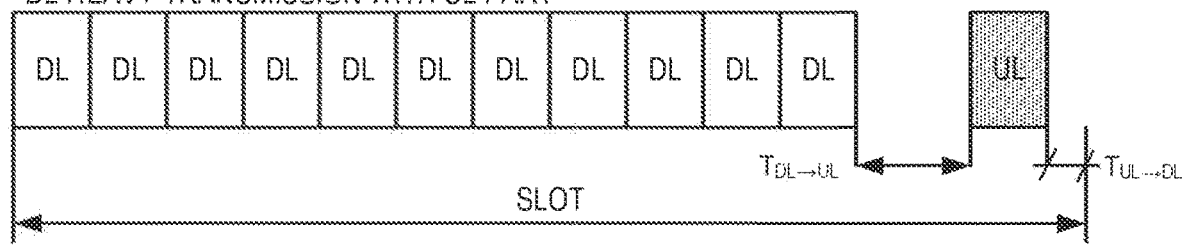
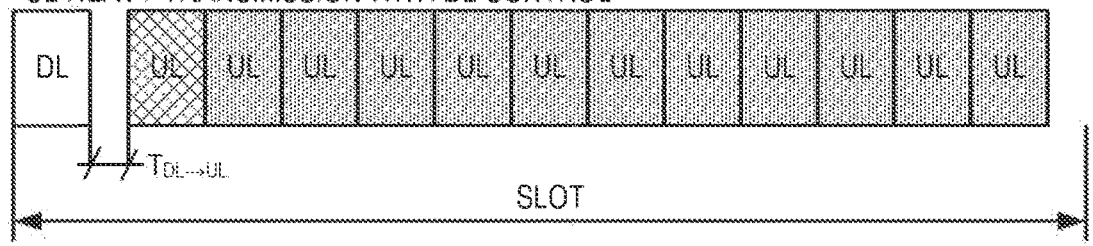
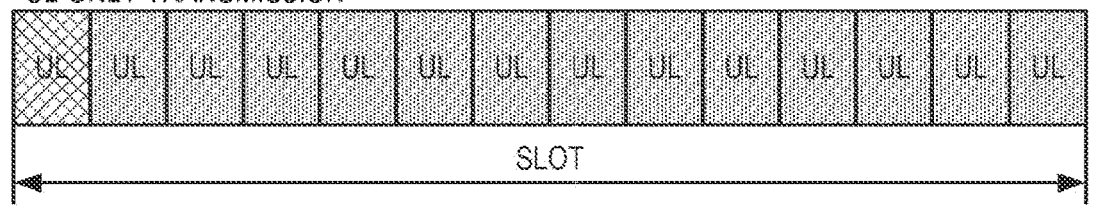
FIG. 2
*Slot Variations*
*(PRIOR ART)*

Mini-Slot with 2 OFDM Symbols
(PRIOR ART)

FIG. 6 *A wireless network in accordance with some embodiments*

User equipment in accordance with some embodiments

FIG. 8 Virtualization environment in accordance with some embodiments

Telecommunication network connected via an intermediate network to a host computer in accordance with some embodiments

*Host computer communicating via a base station with a user equipment over a partially wireless connection in accordance with some embodiments*

Methods implemented in a communication system including a host computer, a base station, and a user equipment in accordance with some embodiments Methods implemented in a communication system including a host computer, a base station, and a user equipment in accordance with some emobidments

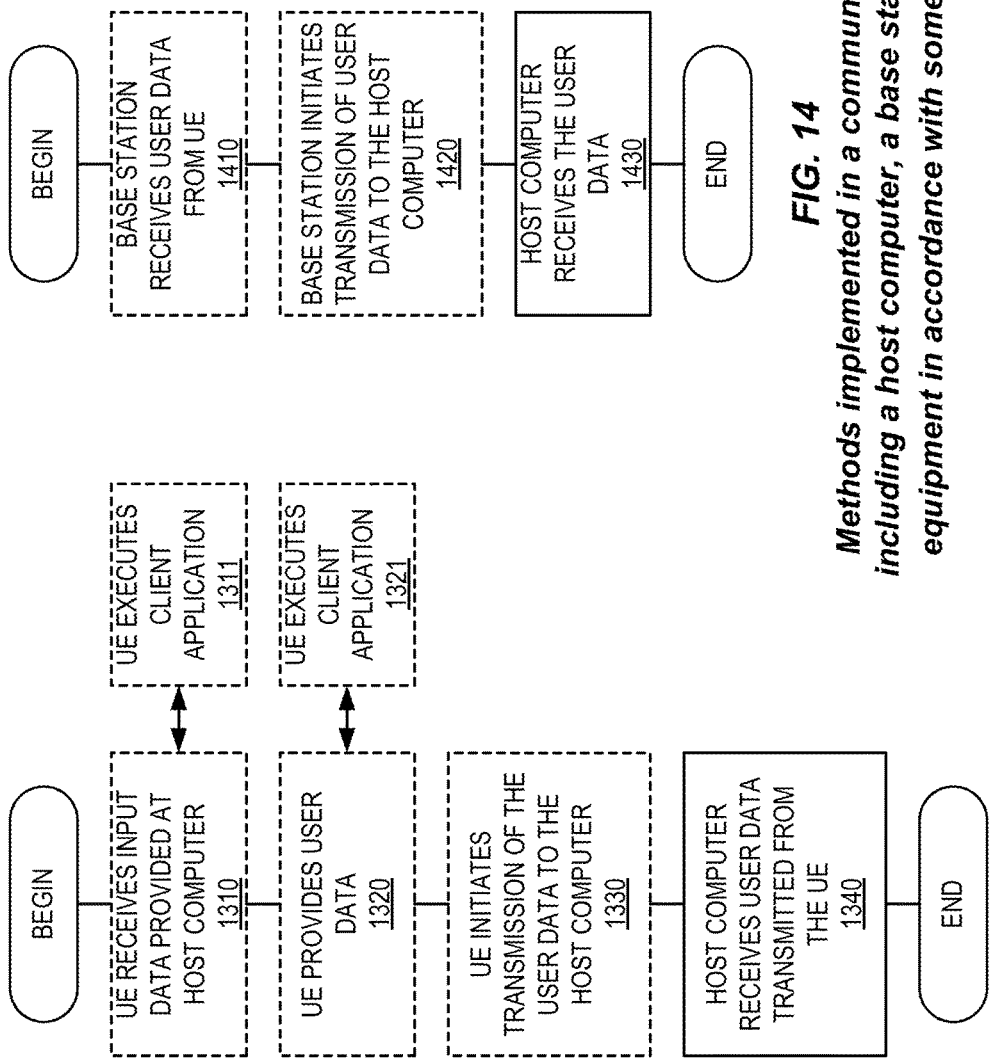

Method in accordance with some embodiments

Virtualization apparatus in accordance with some embodiments

TBS DETERMINATION WITH MULTIPLE BASE GRAPHS

RELATED APPLICATIONS

This application claims the benefit of provisional patent application Ser. No. 62/567,638, filed Oct. 3, 2017, the disclosure of which is hereby incorporated herein by reference in its entirety.

TECHNICAL FIELD

The present disclosure relates to Transport Block Size (TBS) determination in a cellular communications network.

BACKGROUND

In the Third Generation Partnership Project (3GPP), there is an ongoing Study Item that looks into a new radio interface for Fifth Generation (5G) networks. Terms for denoting this new and next generation technology have not yet converged, so the terms New Radio (NR) and 5G are used interchangeably. Moreover, a base-station can be referred to as NR base station (gNB) instead of an enhanced or evolved Node B (eNB). Alternatively the term Transmission-Receive-Point (TRP) can also be used.

Slot Structure

A NR slot consists of several Orthogonal Frequency Division Multiplexing (OFDM) symbols. According to current agreements, a NR slot consists of either 7 or 14 symbols for OFDM subcarrier spacing 60 kilohertz (kHz) and 14 symbols for OFDM subcarrier spacing >60 kHz. FIG. 1 shows a subframe with 14 OFDM symbols. In FIG. 1, $T_s$ and $T_{symb}$ denote the slot and OFDM symbol duration, respectively. In addition, a slot may also be shortened to accommodate downlink (DL)/uplink (UL) transient period or both DL and UL transmissions. Potential variations are shown in FIG. 2.

Furthermore, NR also defines mini-slots. Mini-slots are shorter than slots and can start at any symbol. According to current agreements, a mini-slot duration can be from 1 or 2 symbols up to the number of symbols in a slot minus 1. Mini-slots are used if the transmission duration of a slot is too long or the occurrence of the next slot start (slot alignment) is too late. Applications of mini-slots include, among others, latency critical transmissions and unlicensed spectrum where a transmission should start immediately after Listen-Before-Talk (LBT) succeeds. For latency critical transmissions, both mini-slot length and frequent opportunity of mini-slot are important. For unlicensed spectrum, the frequent opportunity of mini-slot is especially important. An example of mini-slots is shown in FIG. 3.

Control Information

Physical Downlink Control Channels (PDCCHs) are used in NR for Downlink Control Information (DCI), e.g. downlink scheduling assignments and uplink scheduling grants. The PDCCHs are in general transmitted at the beginning of a slot and relate to data in the same or a later slot. For mini-slots, PDCCH can also be transmitted within a regular slot. Different formats (sizes) of the PDCCHs are possible to handle different DCI payload sizes and different aggregation levels, i.e., different code rate for a given payload size. A User Equipment device (UE) is configured, implicitly and/or explicitly, to monitor (i.e., search) for a number of PDCCH candidates of different aggregation levels and DCI payload sizes. Upon detecting a valid DCI message by successful decoding of a candidate where the DCI contains an Identity (ID) that the UE is told to monitor, the UE follows the DCI. For example, the UE receives the corresponding downlink data or transmits in the uplink in accordance with the DCI.

In NR, there are currently discussions on whether to introduce a "broadcasted control channel" to be received by multiple UEs. The channel has been referred to as "group common PDCCH." The exact content of such a channel is currently under discussion. One example of information that might be put in such a channel is information about the slot format, i.e. whether a certain slot is uplink or downlink, which portion of a slot is UL or DL; information which can be useful in a dynamic Time Division Duplexing (TDD) system.

Transmission Parameter Determination

The DCI carries several parameters to instruct the UE on how to receive a downlink transmission or to transmit in the uplink. For example, the Frequency Division Duplexing (FDD) Long Term Evolution (LTE) DCI format 1A carries parameter such as localized/distributed Virtual Resource Block (VRB) assignment flag, resource block assignment, Modulation and Coding Scheme (MCS), Hybrid Automatic Repeat Request (HARQ) process number, new data indicator, redundancy version, and Transmit Power Control (TPC) command for Physical Uplink Control Channel (PUCCH).

One of the key parameters for the UE to receive or transmit in the system is the size of the data block, which is referred to as the Transport Block Size (TBS), to be channel coded and modulated. In LTE, the TBS is determined as follows:

- The UE uses the MCS given by the DCI to read a TBS index $I_{TBS}$ from a MCS table. An example of the MCS table is shown in Table 1.
- The UE determines the number of Physical Resource Blocks (PRBs) as $N_{PRB}$ from the resource block assignment given in the DCI.
- The UE uses the TBS index $I_{TBS}$ and the number of PRBs $N_{PRB}$ to read the actual TBS from a TBS table. A portion of the TBS table is shown in Table 2 as an example.

TABLE 1

LTE modulation and coding scheme (MCS) table

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |

TABLE 1-continued

LTE modulation and coding scheme (MCS) table

| MCS Index $I_{MCS}$ | Modulation Order $Q_m$ | TBS Index $I_{TBS}$ |
|---|---|---|
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

TABLE 2

LTE transport block size (TBS) table (dimension is 27 × 110)

| | $N_{PRB}$ | | | | | | | | |
|---|---|---|---|---|---|---|---|---|---|
| $I_{TBS}$ | 1 | 2 | 3 | 4 | 5 | 6 | 7 | 8 | 9 ... |
| 0 | 16 | 32 | 56 | 88 | 120 | 152 | 176 | 208 | 224 ... |
| 1 | 24 | 56 | 88 | 144 | 176 | 208 | 224 | 256 | 328 ... |
| 2 | 32 | 72 | 144 | 176 | 208 | 256 | 296 | 328 | 376 ... |
| 3 | 40 | 104 | 176 | 208 | 256 | 328 | 392 | 440 | 504 ... |
| 4 | 56 | 120 | 208 | 256 | 328 | 408 | 488 | 552 | 632 ... |
| 5 | 72 | 144 | 224 | 328 | 424 | 504 | 600 | 680 | 776 ... |
| 6 | 328 | 176 | 256 | 392 | 504 | 600 | 712 | 808 | 936 ... |
| 7 | 104 | 224 | 328 | 472 | 584 | 712 | 840 | 968 | 1096 ... |
| 8 | 120 | 256 | 392 | 536 | 680 | 808 | 968 | 1096 | 1256 ... |
| 9 | 136 | 296 | 456 | 616 | 776 | 936 | 1096 | 1256 | 1416 ... |
| 10 | 144 | 328 | 504 | 680 | 872 | 1032 | 1224 | 1384 | 1544 ... |
| 11 | 176 | 376 | 584 | 776 | 1000 | 1192 | 1384 | 1608 | 1800 ... |
| 12 | 208 | 440 | 680 | 904 | 1128 | 1352 | 1608 | 1800 | 2024 ... |
| 13 | 224 | 488 | 744 | 1000 | 1256 | 1544 | 1800 | 2024 | 2280 ... |
| 14 | 256 | 552 | 840 | 1128 | 1416 | 1736 | 1992 | 2280 | 2600 ... |
| 15 | 280 | 600 | 904 | 1224 | 1544 | 1800 | 2152 | 2472 | 2728 ... |
| 16 | 328 | 632 | 968 | 1288 | 1608 | 1928 | 2280 | 2600 | 2984 ... |
| 17 | 336 | 696 | 1064 | 1416 | 1800 | 2152 | 2536 | 2856 | 3240 ... |
| 18 | 376 | 776 | 1160 | 1544 | 1992 | 2344 | 2792 | 3112 | 3624 ... |
| 19 | 408 | 840 | 1288 | 1736 | 2152 | 2600 | 2984 | 3496 | 3880 ... |
| 20 | 440 | 904 | 1384 | 1864 | 2344 | 2792 | 3240 | 3752 | 4136 ... |
| 21 | 488 | 1000 | 1480 | 1992 | 2472 | 2984 | 3496 | 4008 | 4584 ... |
| 22 | 520 | 1064 | 1608 | 2152 | 2664 | 3240 | 3752 | 4264 | 4776 ... |
| 23 | 552 | 1128 | 1736 | 2280 | 2856 | 3496 | 4008 | 4584 | 5160 ... |
| 24 | 584 | 1192 | 1800 | 2408 | 2984 | 3624 | 4264 | 4968 | 5544 ... |
| 25 | 616 | 1256 | 1864 | 2536 | 3112 | 3752 | 4392 | 5160 | 5736 ... |
| 26 | 712 | 1480 | 2216 | 2984 | 3752 | 4392 | 5160 | 5992 | 6712 ... |

The LTE approach has a few problems, as described below.

Problem 1: The LTE TBS table was originally designed with specific assumption on the number of Resource Elements (REs) available within each allocated PRB as well as the number of OFDM symbols for data transmissions. When different transmission modes with different amount of reference symbol overheads were introduced later in LTE, it became difficult to define another TBS table to optimize for the new transmission modes. The companies in 3GPP at the end compromised by introducing a few new rows in the LTE TBS table to optimize for a few limited cases. That is, the explicit TBS table approach hinders continual evolution and improvement of the LTE system.

Problem 2: In the existing approach of determining the data block size does not provide high performance operation with different slot sizes or structures. This is well known problem in LTE system since a subframe in LTE may be of various sizes. A regular subframe may have different sizes of control region and thus leaves different sizes for the data region. TDD LTE supports different sizes in the downlink part (Downlink Pilot Time Slot (DwPTS)) of a TDD special subframe. Various different sizes of subframe are summarized in Table 3.

However, the LTE MCS and TBS tables are designed based on the assumption that 11 OFDM symbols are available for the data transmission. That is, when the actual number of available OFDM symbols for Physical Downlink Shared Channel (PDSCH) is different than 11, the spectral efficiency of the transmission will deviate from those shown in Table 4, which is presented as Table 4a, Table 4b, and Table 4c. First, notice that the code rate becomes excessively high when the actual number of OFDM symbols for PDSCH is substantially less than the assumed 11 symbols. These cases are highlighted in Table 4c. In LTE, the UE is not expected to decode any PDSCH transmission with an effective code rate higher than 0.930. Since the UE will not be able to decode such high code rates, transmissions based on these MCSs in Table 4c will fail and retransmissions will be needed. Secondly, with the mismatch of radio resource assumption, code rates for some of the MCSs deviate out of the optimal range for the wideband wireless system. Based on extensive link performance evaluation for the downlink transmission as an example, the code rates for Quadrature Phase Shift Keying (QPSK) and 16 Quadrature Amplitude Modulation (16QAM) should not be higher than 0.70. Furthermore, the code rates for 16QAM and 64QAM should not be lower than 0.32 and 0.40, respectively. As illustrated in Table 4b, some of the MCSs in Table 4 result in suboptimal code rate.

Since data throughput is reduced when transmissions are based on unsuitable or sub-optimal code rates, a good scheduling implementation in the base station should avoid using any MCSs shown in Tables 4b and 4c. It can be concluded that the number of usable MCSs shrink significantly when the actual number of OFDM symbols for PDSCH deviates from the assumed 11 symbols.

TABLE 3

Available number of OFDM symbols for PDSCH ($N_{OS}$) in LTE

| Operation mode | | Number of OFDM symbols for control information | | | |
|---|---|---|---|---|---|
| | | 1 | 2 | 3 | 4 |
| FDD, TDD | Normal CP | 13 | 12 | 11 | 10 |
| | Extended CP | 11 | 10 | 9 | 8 |

TABLE 3-continued

Available number of OFDM symbols for PDSCH ($N_{OS}$) in LTE

| Operation mode | | Number of OFDM symbols for control information | | | |
|---|---|---|---|---|---|
| | | 1 | 2 | 3 | 4 |
| TDD DwPTS normal CP | configurations 1, 6 | 8 | 7 | 6 | 5 |
| | configurations 2, 7 | 9 | 8 | 7 | 6 |
| | configurations 3, 8 | 10 | 9 | 8 | 7 |
| | configuration 4 | 11 | 10 | 9 | 8 |
| TDD DwPTS extended CP | configurations 1, 5 | 7 | 6 | 5 | 4 |
| | configurations 2, 6 | 8 | 7 | 6 | 5 |
| | configuration 3 | 9 | 8 | 7 | 6 |

TABLE 4

Code rate with different number of OFDM symbols for data transmission in LTE

| MCS index ($I_{MCS}$) | Modulation | Available number of OFDM symbols for PDSCH ($N_{OS}$) | | | | | | | | |
|---|---|---|---|---|---|---|---|---|---|---|
| | | 13 | 12 | 11 | 10 | 9 | 8 | 7 | 6 | 5 |
| 0 | QPSK | 0.10 | 0.11 | 0.12 | 0.13 | 0.14 | 0.16 | 0.18 | 0.21 | 0.25 |
| 1 | QPSK | 0.13 | 0.14 | 0.16 | 0.17 | 0.19 | 0.21 | 0.24 | 0.28 | 0.34 |
| 2 | QPSK | 0.16 | 0.17 | 0.19 | 0.21 | 0.23 | 0.26 | 0.30 | 0.35 | 0.42 |
| 3 | QPSK | 0.21 | 0.22 | 0.25 | 0.27 | 0.30 | 0.34 | 0.39 | 0.45 | 0.54 |
| 4 | QPSK | 0.25 | 0.28 | 0.30 | 0.33 | 0.37 | 0.41 | 0.47 | 0.55 | 0.66 |
| 5 | QPSK | 0.31 | 0.34 | 0.37 | 0.41 | 0.45 | 0.51 | 0.58 | 0.68 | |
| 6 | QPSK | 0.37 | 0.40 | 0.44 | 0.48 | 0.54 | 0.61 | 0.69 | | |
| 7 | QPSK | 0.44 | 0.47 | 0.52 | 0.57 | 0.63 | | | | |
| 8 | QPSK | 0.50 | 0.54 | 0.59 | 0.65 | | | | | |
| 9 | QPSK | 0.56 | 0.61 | 0.67 | | | | | | |
| 10 | 16QAM | | | 0.33 | 0.37 | 0.41 | 0.46 | 0.52 | 0.61 | 0.73 |
| 11 | 16QAM | | 0.34 | 0.37 | 0.41 | 0.45 | 0.51 | 0.58 | 0.68 | 0.81 |
| 12 | 16QAM | 0.36 | 0.39 | 0.43 | 0.47 | 0.52 | 0.58 | 0.67 | | |
| 13 | 16QAM | 0.40 | 0.44 | 0.48 | 0.53 | 0.58 | 0.66 | | | |
| 14 | 16QAM | 0.46 | 0.50 | 0.54 | 0.59 | 0.66 | | | | |
| 15 | 16QAM | 0.51 | 0.55 | 0.60 | 0.66 | | | | | |
| 16 | 16QAM | 0.54 | 0.59 | 0.64 | | | | | | |
| 17 | 64QAM | | | 0.43 | 0.47 | 0.52 | 0.59 | 0.67 | 0.79 | |
| 18 | 64QAM | | 0.42 | 0.46 | 0.50 | 0.56 | 0.63 | 0.72 | 0.83 | |
| 19 | 64QAM | 0.43 | 0.46 | 0.51 | 0.56 | 0.62 | 0.69 | 0.79 | 0.93 | |
| 20 | 64QAM | 0.47 | 0.51 | 0.55 | 0.61 | 0.68 | 0.76 | 0.87 | | |
| 21 | 64QAM | 0.51 | 0.55 | 0.60 | 0.66 | 0.74 | 0.83 | | | |
| 22 | 64QAM | 0.55 | 0.60 | 0.65 | 0.72 | 0.79 | 0.89 | | | |
| 23 | 64QAM | 0.59 | 0.64 | 0.70 | 0.77 | 0.86 | | | | |
| 24 | 64QAM | 0.64 | 0.69 | 0.75 | 0.83 | 0.92 | | | | |
| 25 | 64QAM | 0.68 | 0.74 | 0.80 | 0.88 | | | | | |
| 26 | 64QAM | 0.72 | 0.78 | 0.85 | | | | | | |
| 27 | 64QAM | 0.75 | 0.81 | 0.89 | | | | | | |
| 28 | 64QAM | 0.88 | | | | | | | | |
| 0 | QPSK | | | | | | | | | |
| 1 | QPSK | | | | | | | | | |
| 2 | QPSK | | | | | | | | | |
| 3 | QPSK | | | | | | | | | |
| 4 | QPSK | | | | | | | | | |
| 5 | QPSK | | | | | | | | | 0.81 |
| 6 | QPSK | | | | | | | | 0.81 | |
| 7 | QPSK | | | | | | | 0.71 | 0.81 | |
| 8 | QPSK | | | | | | 0.72 | 0.81 | 0.93 | |
| 9 | QPSK | | | | | 0.73 | 0.81 | | | |
| 10 | 16QAM | 0.28 | 0.30 | | | | | | | |
| 11 | 16QAM | 0.31 | | | | | | | | |
| 12 | 16QAM | | | | | | | | 0.78 | |
| 13 | 16QAM | | | | | | | 0.75 | 0.88 | |
| 14 | 16QAM | | | | | | 0.74 | 0.85 | | |
| 15 | 16QAM | | | | | 0.74 | 0.83 | | | |
| 16 | 16QAM | | | | 0.71 | 0.79 | 0.88 | | | |
| 17 | 64QAM | 0.36 | 0.39 | | | | | | | |
| 18 | 64QAM | 0.39 | | | | | | | | |
| 19 | 64QAM | | | | | | | | | |

TABLE 4-continued

Code rate with different number of OFDM symbols for data transmission in LTE

| MCS index ($I_{MCS}$) | Modulation | Available number of OFDM symbols for PDSCH ($N_{OS}$) | | | | | | | | |
|---|---|---|---|---|---|---|---|---|---|---|
| | | 13 | 12 | 11 | 10 | 9 | 8 | 7 | 6 | 5 |
| 20 | 64QAM | | | | | | | | | |
| 21 | 64QAM | | | | | | | | | |
| 22 | 64QAM | | | | | | | | | |
| 23 | 64QAM | | | | | | | | | |
| 24 | 64QAM | | | | | | | | | |
| 25 | 64QAM | | | | | | | | | |
| 26 | 64QAM | | | | | | | | | |
| 27 | 64QAM | | | | | | | | | |
| 28 | 64QAM | | | | | | | | | |
| 0 | QPSK | | | | | | | | | |
| 1 | QPSK | | | | | | | | | |
| 2 | QPSK | | | | | | | | | |
| 3 | QPSK | | | | | | | | | |
| 4 | QPSK | | | | | | | | | |
| 5 | QPSK | | | | | | | | | |
| 6 | QPSK | | | | | | | | | 0.97 |
| 7 | QPSK | | | | | | | | 0.94 | 1.13 |
| 8 | QPSK | | | | | | | | 1.08 | 1.30 |
| 9 | QPSK | | | | | | 0.91 | 1.05 | 1.22 | 1.46 |
| 10 | 16QAM | | | | | | | | | |
| 11 | 16QAM | | | | | | | | | |
| 12 | 16QAM | | | | | | | | | | 0.94 |
| 13 | 16QAM | | | | | | | | | | 1.05 |
| 14 | 16QAM | | | | | | | | | 0.99 | 1.19 |
| 15 | 16QAM | | | | | | | | 0.95 | 1.10 | 1.33 |
| 16 | 16QAM | | | | | | | | 1.01 | 1.18 | 1.41 |
| 17 | 64QAM | | | | | | | | | | 0.94 |
| 18 | 64QAM | | | | | | | | | | 1.00 |
| 19 | 64QAM | | | | | | | | | | 1.11 |
| 20 | 64QAM | | | | | | | | | 1.01 | 1.22 |
| 21 | 64QAM | | | | | | | | 0.95 | 1.10 | 1.32 |
| 22 | 64QAM | | | | | | | | 1.02 | 1.19 | 1.43 |
| 23 | 64QAM | | | | | | | | 0.96 | 1.10 | 1.29 | 1.54 |
| 24 | 64QAM | | | | | | | | 1.04 | 1.18 | 1.38 | 1.66 |
| 25 | 64QAM | | | | | | | 0.98 | 1.10 | 1.26 | 1.47 | 1.77 |
| 26 | 64QAM | | | | | | 0.94 | 1.04 | 1.17 | 1.34 | 1.56 | 1.88 |
| 27 | 64QAM | | | | | | 0.98 | 1.09 | 1.22 | 1.40 | 1.63 | 1.95 |
| 28 | 64QAM | | | 0.95 | 1.04 | 1.15 | 1.27 | 1.43 | 1.64 | 1.91 | 2.29 |

Problem 3: As mentioned in above, the slot structure for NR tends to be more flexible with much larger range of the amount of allocated resource for UE to receive or transmit. The base of designing a TBS table diminishes significantly.

There is a need for systems and methods for determining TBS, e.g., for NR, in such a manner that addresses the problems discussed above.

SUMMARY

Systems and methods are disclosed herein for determining and using a Transport Block Size (TBS) when two or more Low Density Parity Check (LDPC) base graphs can be used for LPDC coding. In some embodiments, a method comprises determining a Transport Block Size (TBS) for a transport block communicated between a network node and a wireless device via a physical channel transmission using a formula such that code block segmentation of the transport block results in equal sized code blocks independent of which of two different LDPC base graphs is used for the code block segmentation. The method further comprises transmitting or receiving the transport block according to the determined TBS.

In some embodiments, determining the TBS comprises determining that a code rate R for the physical channel transmission is less than or equal to ¼. Determining the TBS further comprises, upon determining that R is less than or equal to ¼, determining a number of code blocks C for the physical channel transmission based on an approximation of the TBS, a number of Cyclic Redundancy Check (CRC) bits attached to each transport block of the physical channel transmission, and a number of CRC bits attached to each code block of the physical channel transmission when using a first base graph for the code block segmentation and determining the TBS for the physical channel transmission based on the number of code blocks C, the approximation of the TBS, and the number of CRC bits attached to each transport block of the physical channel transmission.

In some embodiments, determining the number of code blocks C comprises rounding up a ratio A/B to a nearest integer, wherein A is a sum of the approximation of the TBS and the number of CRC bits attached to each transport block of the physical channel transmission and B is a difference of a maximum TBS for the first base graph and the number of CRC bits attached to each code block of the physical channel transmission. Further, in some embodiments, determining the TBS for the physical channel transmission based on the number of code blocks C, the approximation of the TBS, and the number of CRC bits attached to each transport block of the physical channel transmission comprises determining the TBS as $X \cdot Y - Z$, wherein X is a value that is a function of C, Y is a value resulting from rounding a ratio $Y_{num}/$ $Y_{denom}$ to a nearest integer where $Y_{num}$ is the sum of the approximation of the TBS and the number of CRC bits attached to each transport block of the physical channel transmission and $Y_{denom}=X$, and Z is the number of CRC bits attached to each transport block of the physical channel transmission. Further, in some embodiments, X=C·8. In some other embodiments, X is equal to a least common multiple of C and 8.

In some embodiments, both the number of CRC bits attached to each transport block of the physical channel transmission and the number of CRC bits attached to each code block of the physical channel transmission are equal to 24.

In some embodiments, determining the TBS comprises determining that a code rate R for the physical channel transmission is greater than ¼ and determining that an approximation of the TBS is greater than a threshold. Determining the TBS further comprises, upon determining that R is greater than ¼ and determining that the approximation of the TBS is greater than the threshold, determining a number of code blocks C for the physical channel transmission based on an approximation of the TBS, a number of CRC bits attached to each transport block of the physical channel transmission, and a number of CRC bits attached to each code block of the physical channel transmission when using a first base graph and determining the TBS for the physical channel transmission based on the number of code blocks C, the approximation of the TBS, and the number of CRC bits attached to each transport block of the physical channel transmission.

In some embodiments, determining the number of code blocks C comprises determining the number of code blocks C by rounding up a ratio A/B to a nearest integer, wherein A is a sum of the approximation of the TBS and the number of CRC bits attached to each transport block of the physical channel transmission and B is a difference of a maximum TBS for the first base graph and the number of CRC bits attached to each code block of the physical channel transmission. Further, in some embodiments, determining the TBS for the physical channel transmission based on the number of code blocks C, the approximation of the TBS, and the number of CRC bits attached to each transport block of the physical channel transmission comprises determining the TBS as X·Y−Z, wherein X is a value that is a function of C, Y is a value sum of the approximation of the TBS and the number of CRC bits attached to each transport block of the physical channel transmission and $Y_{denom}=X$, and Z is the number of CRC bits attached to each transport block of the physical channel transmission. In some embodiments, X=C·8. In some other embodiments, X is equal to the least common multiple of C and 8.

In some embodiments, both the number of CRC bits attached to each transport block of the physical channel transmission and the number of CRC bits attached to each code block of the physical channel transmission are equal to 24.

In some embodiments, the TBS is determined using the formula, as a consequence determining that an approximation of the TBS is greater than a predetermined value. Further, another TBS for another transport block communicated between the network node and the wireless device via another physical channel transmission is determined using a table, as a consequence of determining that an approximation for the another TBS is less than or equal to the predetermined value.

In some embodiments, all entries (k) in the table satisfy the following conditions: k is a multiple of 8, $$(k+M_0)\bmod \left\lceil \frac{k+M_0}{Z_1-M_1} \right\rceil = 0, \text{ and } (k+M_2)\bmod \left\lceil \frac{k+M_2}{Z_2-M_3} \right\rceil = 0,$$

where $M_0$ is the number of CRC bits attached to the transport block if the first basegraph is used, $Z_1$ is a predetermined maximum TBS for a first one of the two different base graphs, $M_1$ is a number of CRC bits attached to each code block after segmentation if a number of code blocks is greater than 1 and the first basegraph is used, $M_2$ is a number of CRC bits attached to the transport block if the second basegraph is used, $Z_2$ is a maximum TBS for a second one of the two different base graphs, and $M_3$ is a number of CRC bits attached to each code block after segmentation if the number of code blocks is greater than 1 and the second basegraph is used. $M_0$ and $M_2$ can depend on k.

In some embodiments, the TBS is determined by the wireless device based on downlink control information (DCI) received from the network node, and the transport block is received by the wireless device from the network node according to the determined TBS.

In some embodiments, the TBS is determined by the wireless device based on downlink control information (DCI) received from the network node, and the transport block is transmitted from the wireless device to the network node according to the determined TBS.

In some embodiments, the TBS is determined by the network node, and the transport block is transmitted by the network node to the wireless device.

In some other embodiments, a method comprises determining a TBS for a transport block communicated between a network node and a wireless device via a physical channel transmission. The method further comprises performing code block segmentation on the transport block according to the determined TBS, wherein performing the code block segmentation comprises selectively inserting filler bits into code blocks to achieve equal sized code blocks based on whether the code block segmentation is performed with a first LDPC base graph or a second LDPC base graph. The method further comprises transmitting or receiving the transport block according to the TBS.

In some embodiments, selectively inserting the filler bits comprises inserting the filler bits during code block segmentation when a code rate for the physical channel transmission is less than ¼.

In some other embodiments, a method comprises determining an approximate TBS for a transport block communicated between a network node and a wireless device via a physical channel transmission, determining, as a TBS for the transport block, a smallest entry in a table that is larger than or equal to the approximate TBS, and transmitting or receiving the transport block according to the determined TBS.

In some embodiments, all entries in the table are multiples of eight, all entries in the table give rise to equal size code blocks when code block segmentation is performed with a first base graph having a first predetermined maximum code block size after attachment of transport block level and code block level CRC bits, and all entries in the table give rise to equal size code blocks when code block segmentation is performed with a second base graph having a second predetermined maximum code block size after attachment of transport block level and code block level CRC bits.

Embodiments of a radio node (e.g., a base station or a wireless device) are also disclosed.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 2 illustrates potential slot variations;

FIG. 13 is a flowchart illustrating a method implemented in a communication system in accordance with one embodiment;

FIG. 14 is a flowchart illustrating a method implemented in a communication system in accordance with one embodiment;

DETAILED DESCRIPTION

Figure 1:
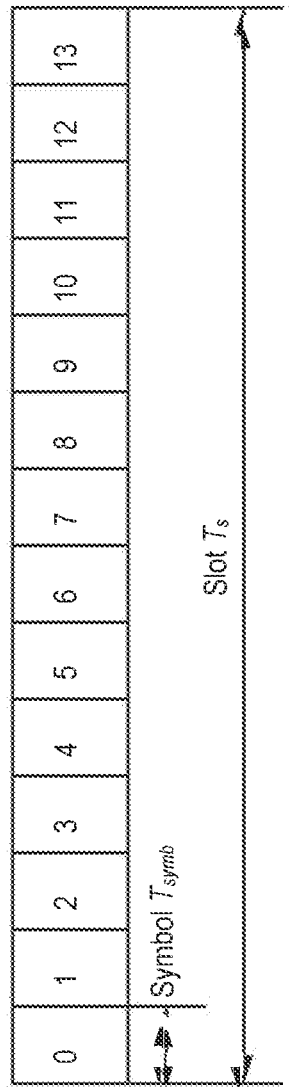
FIG. 1 shows a subframe with 14 Orthogonal Frequency Division Multiplexing (OFDM) symbols.
Figure 3:
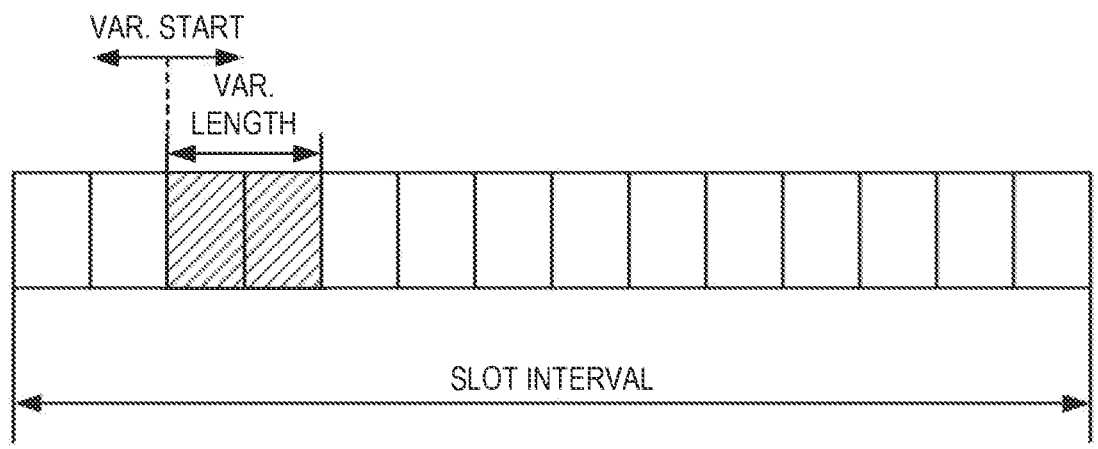
FIG. 3 illustrates an example of a mini-slot.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In the present application, the terms User Equipment device (UE), terminal, handset, etc. are used interchangeably to denote the device that communicates with the infrastructure. The term should not be construed as to mean any specific type of device, it applies to them all, and the solutions described here are applicable to all devices that use the concerned solution to solve the problems as described. Similarly, a base station is intended to denote the node in the infrastructure that communicates with the UE. Different names may be applicable, and the functionality of the base station may also be distributed in various ways. For example, there could be a radio head terminating parts of the radio protocols and a centralized unit that terminates other parts of the radio protocols. We will not distinguish such implementations here; instead, the term base station will refer to all alternative architectures that can implement embodiments of the present disclosure.

Some of the embodiments contemplated herein will now be described more fully with reference to the accompanying drawings. Others, embodiments, however, are contained within the scope of the subject matter disclosed herein, and the disclosed subject matter should not be construed as limited to only the embodiments set forth herein; rather, these embodiments are provided by way of example to convey the scope of the subject matter to those skilled in the art.

To address the aforementioned problems associated with the Transport Block Size (TBS) determination scheme used in Long Term Evolution (LTE), suggestions have been made to determine the TBS through a formula instead of a table. One example where the TBS is determined as follows:

$$TBS = C \times \left\lfloor \frac{N_{PRB} \cdot N_{RE}^{DL,PRB} \cdot \upsilon \cdot Q_m \cdot R}{C} \right\rfloor$$

where $\upsilon$ is number of layers the codeword is mapped onto;

$N_{RE}^{DL,PRB}$ is the number of Resource Elements (REs) per Physical Resource Block (PRB) per slot/mini-slot available for carrying the Physical Downlink Shared Channel (PDSCH);

$N_{PRB}$ is the number of allocated PRBs;

modulation order, $Q_m$, and target code rate, $R$, are read from a Modulation and Coding Scheme (MCS) table based on $I_{MCS}$ signaled in the Downlink Control Information (DCI); and an example value of C is 8, to ensure that TBS is a multiple of 8.

Here $N_{PRB}$, $N_{RE}^{DL,PRB}$, $\upsilon$, $Q_m$, $R$ are signaled through DCI or are configured through higher layers. Other formulas are also possible.

A way of achieving equal size codeblocks when designing TBS for a single Low-Density Parity-Check (LDPC) base graph is to use formulas like the following. Consider the formula:

$$TBS = 8 \times \left\lfloor \frac{N_{PRB} \cdot N_{RE}^{DL,PRB} \cdot \upsilon \cdot Q_m \cdot R}{8} \right\rfloor$$

This formula can be described as:

$$TBS = 8 \times \left\lceil \frac{TBS_0}{8} \right\rceil$$

where $TBS_0$ is an approximation of the actual TBS determined according to scheduling resources, MCS, and Multiple Input Multiple Output (MIMO) configuration:

$$TBS_0 = N_{PRB} \cdot N_{RE}^{DL,PRB} \cdot \upsilon \cdot Q_m \cdot R$$

In general, $TBS_0$ can determined via any formula for a desired approximate TBS. Another example of how to determine $TBS_0$ is to find it in a look-up table such as the LTE TBS table.

Assume that the number of codeblocks C is determined in the following manner, which is similar to LTE. The total number of codeblocks C is determined by:

```
If TBS + L₁ ≤ Z
    Number of codeblocks: C = 1
Else
    Number of codeblocks: C = ⌈(TBS + L₂)/(Z − L₃)⌉
End if
```

If C=1, $L_1$ CRC bits are attached to each transport block. If C>1, $L_2$ CRC bits are attached to each transport block and $L_3$ additional Cyclic Redundancy Check (CRC) bits are attached to each codeblock after segmentation. Z is a maximum codeblock size including CRC bits. Some example values of $L_1$, $L_2$, and $L_3$ are 0, 8, 16, or 24. Some or all of $L_1$, $L_2$, and $L_3$ might be equal.

In one example, the TBS is determined as follows:

If $C = 1$ $$TBS = A \times \left\lceil \frac{TBS_0}{A} \right\rceil \text{ Else}$$

$$TBS = C \times A \times \left\lceil \frac{TBS_0 + L_2}{C \times A} \right\rceil - L_2 \text{ End if.}$$

An example value of A is 8, to ensure that TBS is a multiple of 8. Another example value of A is 1.

In another example, the TBS is determined as follows:

If $C = 1$ $$TBS = A \times \left\lceil \frac{TBS_0}{A} \right\rceil \text{ Else}$$

$$TBS = lcm(C, A) \times \left\lceil \frac{TBS_0 + L_2}{lcm(C, A)} \right\rceil - L_2 \text{ End if.}$$

Here lcm(C, A) is the least common multiple of A and C. An example value of A is 8, to ensure that TBS is a multiple of 8. Another example value of A is 1.

If after adding any CRC bits, the transport block is larger than the largest possible codeblock size, the transport block needs to be segmented into several codeblocks. In LTE, this procedure is described in Third Generation Partnership Project (3GPP) Technical Specification (TS) 36.212 V13.2.0 (2016 June) Section 5.1.2. A similar procedure is likely to be adopted in New Radio (NR).

There are two sets of LDPC codes defined for NR. One set is designed for code rates from ~8/9 to 1/3 and block lengths up to 8448 and is referred to as base graph #1, also called BG #1. The other set is defined for code rates from ~2/3 to 1/5 and block lengths up to 3840 and is referred to as base graph #2 or BG #2. When these LDPC codes are used with lower rates than that for which they were designed, repetition and chase combining is used to achieve a lower code rate.

There currently exist certain challenge(s). The LTE TBS table is designed so that when codeblock segmentation is performed, all codeblocks have the same size after segmentation. This property is desirable since it makes implementation easier. When a formula such as the ones described above is applied, this property is not necessarily fulfilled.

One way of achieving equal size codeblocks is to zero pad the transport block before codeblock segmentation. This has some drawbacks. If the padded zeros are marked as <NULL> and removed before transmission, this leads to different codeblocks having different code rates, which is inefficient. If the padded zeros are not removed before transmission, this leads to transmission of useless bits which is inefficient.

NR uses two different base graphs for LDPC codes, with different maximum codeblock size. The base graph that is used depends on the effective code rate of the initial transmission. When using the formula described above to achieve equal size codeblocks for one base graph with a given maximum codeblock size, e.g. 8448, the calculated TBS does not necessarily give equal size codeblocks when codeblock segmentation is performed using a different base graph with a different maximum codeblock size, e.g. 3840. This gives rise to filler bits in codeblock segmentation for example for UEs that implement only one of the base graphs in NR.

Certain aspects of the present disclosure and their embodiments may provide solutions to the aforementioned problems or other challenges. In one embodiment, the proposed solution lists in a table all or a subset of possible TBSs that give equal size codeblocks when codeblock segmentation is performed with any of the two base graphs in NR. First an approximate TBS ($TBS_0$) is calculated using a formula, and then a value close to $TBS_0$ is selected from the table.

Certain embodiments may provide one or more of the following technical advantage(s). In some embodiments, the proposed solution gives equal size codeblocks when codeblock segmentation is performed using either base graph in NR.

Figure 4:
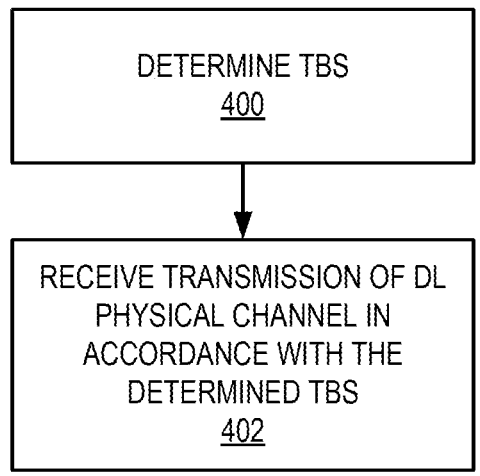
FIG. 4 illustrates the operation of a User Equipment (UE) to determine and use a Transport Block Size (TBS) for downlink reception in accordance with some embodiments of the present disclosure.
Figure 5:
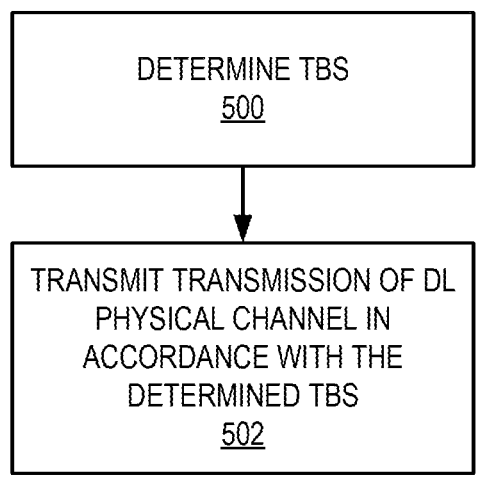
FIG. 5 illustrates the operation of a base station to determine and use a TBS for downlink transmission in accordance with some embodiments of the present disclosure.

Systems and methods are described herein for determining TBS. In particular, a radio node determines a TBS for a transmission of a physical channel and transmits or receives the transmission in accordance with the determined TBS. In this regard, FIG. 4 illustrates an example in which a UE determines a TBS for a transmission of a downlink physical channel (e.g., a physical downlink data channel) (step 400) and receives the transmission in accordance with the determined TBS (step 402). FIG. 5 illustrates an example in which a UE determines a TBS for a transmission of an uplink physical channel (e.g., a physical uplink channel) (step 500) and transmits the transmission in accordance with the determined TBS (step 502). The following discussion provides details for how the TBS is determined, e.g., in steps 400 and 500.

In some embodiments, UEs implement both of the two base graphs (BG1 and BG2) in NR. In this regard, in a first embodiment (Embodiment 1), a formula based approach to determining the TBS can take $TBS_0$ as given above as an input and output a final TBS that is byte-aligned and gives equal-sized codeblocks after codeblock segmentation, as per the agreements and working assumptions above. The working assumption that determines which base graph to use depending on the rate of the initial transmission determines which maximum codeblock size to use when calculating the TBS so that the codeblocks are equal-sized after segmentation.

The determination of TBS can be performed as follows, with an approximate TBS ($TBS_0$) and a code rate ($R_{init}$) as input. The following procedure assumes that both BG1 and BG2 are available for the given physical channel, where the transmitter and receiver implement both BG1 and BG2.

---

If $R_{init} > \frac{1}{4}$ /// Use BG1
  If $TBS_0 + L_1 \leq Z_1$
    Number of codeblocks: C = 1
    If $TBS_0 \leq 3824$ $$\text{Transport block size: } TBS = 8 \cdot \left\lceil \frac{TBS_0}{8} \right\rceil$$

Length of information block to LDPC encoder: CBS = TBS + $L_0$
    Else $$\text{Transport block size: } TBS = 8 \times \left\lceil \frac{TBS_0}{8} \right\rceil$$

Length of information block to LDPC encoder:
    CBS = TBS + $L_1$
    End
  Else
    Number of codeblocks: $C = \lceil (TBS_0 + L_1)/(Z_1 - L_2) \rceil$ $$\text{Transport block size: } TBS = lcm(C, 8) \cdot \left\lceil \frac{TBS_0 + L_1}{lcm(C, 8)} \right\rceil - L_1$$

Length of information block to LDPC encoder:

$$CBS = \frac{TBS + L_1}{c} + L_2$$

End
Else /// Use BG2
  If $TBS_0 + L_0 \leq Z_2$
    Number of codeblocks: C =1

$$\text{Transport block size: } TBS = 8 \cdot \left\lceil \frac{TBS_0}{8} \right\rceil$$

Length of information block to LDPC encoder:
    CBS = TBS + $L_0$
  Else
    Number of codeblocks: $C = \lceil (TBS_0 + L_1)/(Z_2 - L_2) \rceil$ $$\text{Transport block size: } TBS = lcm(C, 8) \cdot \left\lceil \frac{TBS_0 + L_1}{lcm(C, 8)} \right\rceil - L_1$$

Length of information block to LDPC encoder:

$$CBS = \frac{TBS + L_1}{c} + L_2$$

End
End

--- with $L_1 = L_2 = 24$, $L_0 = 16$, $Z_1 = 8448$, $Z_2 = 3840$. Note that $L_0$ is a number of CRC bits attached to each transport block if the $TBS \leq 3824$_, $L_1$ is a number of CRC bits attached to each transport block if the TBS>3824, $L_2$ is a number of additional CRC bits attached to each codeblock after segmentation if C>1 (i.e., if they are segmented), $Z_1$ is a maximum codeblock size (including CRC bits) for BG1, and $Z_2$ is a maximum code block size (including CRC bits) for BG2.

Further, lcm(C, A) is the least common multiple of C and A. The multiplication and division by lcm(C, A) ensures that the TBS is byte-aligned and that the codeblocks are equal-sized. Note that, when comparing the $L_X$ variables above with the $M_X$ described elsewhere in this document, $L_0 = M_0$; if TBS>3824, then $M_0 = M_2 = L_1$; if $TBS \leq 3824$, $M_0 = M_2 = L_0$, and $M_1 = M_3 = L_2$.

A second embodiment (Embodiment 2) in which UEs implement both of the two base graphs (BG1 and BG2) in NR is as follows. In the first embodiment described above, it is assumed that BG2 can be used to support arbitrarily large TBS as long as Rinit<Rthreshold, Rthreshold=¼. One variation is that BG2 is further limited to be applicable to TBS<=TBSmax2. Then for TBS>TBSmax2, BG1 is always used.

In some other embodiments, UEs implement only one of the two base graphs for NR. For UEs implementing only one base graph, three options for TBS determination are as follows:

Option 1: Use a different TBS formula for UEs implementing only one base graph, e.g. a UE implementing only BG1 performs codeblock segmentation using 8448 as the maximum codeblock size for all code rates. Adjust the TBS determination accordingly to ensure equal size codeblocks.

Option 2: Use the above procedure in Embodiment 1 or Embodiment 2 for TBS determination, and use filler bits which are not transmitted to handle any TBSs that give rise to codeblocks of unequal size.

Option 3: Change the TBS determination formula so that all or some of the TBSs used ensure equal sized codeblocks independent of which base graph is used for codeblock segmentation.

Embodiments of the present disclosure provide TBS determination using Option 1, Option 2, and/or Option 3. For example, in some embodiments, TBS determination is performed in accordance with Option 3. In some other embodiments, TBS determination is performed in accordance with a mix of Option 2 and Option 3, where some range(s) of TBSs are covered by Option 3 and some other range(s) of TBSs are covered by Option 2.

Option 1 has the drawback that the TBS determination depends on which base graphs the UE supports, and higher layers need to consider which base graphs the UE supports, in the sense that the exact same scheduling assignment can give rise to different TBS depending on which base graph is used. Option 1 is not transparent to higher layers.

Option 2 allows for a TBS determination that is independent of the UE category, but leads to slightly more implementation and specification complexity due to the extra filler bits that need to be inserted for some TB sizes. Specifically, for Rinit>¼, since the TBS is tailored for BG1, filler bits may be required when BG2 is used (e.g., for a BG2-only UE); similarly, for Rinit<=¼, since the TBS is tailored for BG2, filler bits may be required when BG1 is used (e.g., for a BG1-only UE). Option 2 requires insertion of filler bits in codeblock segmentation for some TBS.

Option 3 also allows for TBS determination independent of the UE category, but the requirement that the TBS gives rise to equally sized codeblocks when segmenting with both BG1 and BG2 makes the usable TBS sparser and makes the TBS determination slightly more complex. Option 3 gives sparser TBS and is more complex to implement and specify.

Details of Option 3: In one non-limiting embodiment, an approximate TBS $TBS_0$ is determined, either from a formula as described above, or through a table lookup. The TBS is then chosen as the smallest integer larger than or equal to $TBS_0$ satisfying the following conditions:

1. $k$ is a multiple of 8
2. $(k + M_0) \bmod \left\lceil \frac{k + M_0}{Z_1 - M_1} \right\rceil = 0$
3. $(k + M_2) \bmod \left\lceil \frac{k + M_2}{Z_2 - M_3} \right\rceil = 0$ where $M_0$ is the number of CRC bits attached to the transport block if the first basegraph is used, $Z_1$ is a predetermined maximum TBS for a first one of the two different base graphs, $M_1$ is a number of CRC bits attached to each code block after segmentation if a number of code blocks is greater than 1 and the first basegraph is used, $M_2$ is a number of CRC bits attached to the transport block if the second basegraph is used, $Z_2$ is a maximum TBS for a second one of the two different base graphs, and $M_3$ is a number of CRC bits attached to each code block after segmentation if the number of code blocks is greater than 1 and the second basegraph is used. $M_0$ and $M_2$ can depend on k.

In another non-limiting embodiment, the TBS is chosen as the integer k that satisfies conditions 1-3 with smallest absolute difference $|k-TBS_0|$ to $TBS_0$.

One way of finding the smallest integer larger than or equal to $TBS_0$ that satisfies conditions 1-3 is the following algorithm:

$k = 8\lceil TBS_0/8 \rceil$,

FOUND = FALSE

While (FOUND == FALSE)

If $(k + M_0) \bmod \left\lceil \frac{k + M_0}{Z_1 - M_1} \right\rceil == 0$

If $(k + L_2) \bmod \left\lceil \frac{k + M_2}{Z_2 - M_3} \right\rceil == 0$

FOUND = TRUE

End if

End if $k = k + 8$

End while $TBS = k$

In one non-limiting embodiment, an approximate TBS $TBS_0$ is determined, either from a formula as described above, or through a table lookup. The TBS is then chosen from a table of possible values based on $TBS_0$. In one non-limiting example, the TBS is chosen as the smallest entry in the table that is larger than or equal to $TBS_0$. In another non-limiting example, the TBS is chosen as the entry in the table that is closest to $TBS_0$. In another non-limiting example, the TBS is chosen as in one of the embodiments described above, unless the coding rate as defined by the TBS plus any added CRC bits on transport block and codeblock level divided by the number of coded bits that can fit in the allocated resources exceeds a certain threshold. In this case the TBS is chosen as the largest value in the table for which the coding rate does not exceed the threshold.

In one example, the table contains all integers k between TBS_min, the smallest possible TBS_value, and TBS_max satisfying:

1. $k$ is a multiple of 8
2. $(k + M_0) \bmod \left\lceil \frac{k + M_0}{Z_1 - M_1} \right\rceil = 0$
3. $(k + M_2) \bmod \left\lceil \frac{k + M_2}{Z_2 - M_3} \right\rceil = 0$ This ensures that all entries in the table are multiples of 8 (i.e., byte-aligned). Condition 2 ensures that all entries in the table give rise to equal size codeblocks when codeblock segmentation is performed with a base graph with maximum codeblock size $Z_1$, after transport block level and codeblock level CRC bits are attached. Condition 3 ensures that all entries in the table give rise to equal size codeblocks when codeblock segmentation is performed with a base graph with maximum codeblock size $Z_2$, after transport block level and codeblock level CRC bits are attached. Other similar conditions can be added if more than two base graphs are used.

Some example values used in NR are $M_0=24$ for k>3824, and $M_0=16$ for k<3824. $M_1=M_2=24$, $Z_1=8448$, $Z_2=3840$.

In another non-limiting example, the table contains a subset of the integers satisfying 1-3 above. For example, the entries in the table could be chosen such that $$\frac{k_l}{k_{l+1}}$$

goes not exceed a certain value, for example 0.95, for some l. One reason for limiting the number of entries in the table is to reduce implementation and specification complexity.

In another non-limiting example, different ways of determining the TBS are used for different ranges of TBS. For example, for values of the scheduling resources, MCS and MIMO configuration corresponding to large TBS, or a certain range of LDPC code rates, the TBS is determined according to a formula as described above using only one maximum codeblock size from one base graph as input, while for other values a table where the entries satisfy conditions 1-3 above are used.

Note that for small values of TBS a different way of determining the TBS can be used to take into account performance differences for LDPC codes of small blocklength.

In another example, some entries of the table satisfy conditions 1-3, while some other entries only satisfy conditions (1 and 2) or (1 and 3). This means that for some ranges of TBS, codeblock segmentation gives rise to equally sized codeblocks for both BG1 and BG2, while some other range only gives rise to equally sized codeblocks for one of the base graphs.

What follows is an example table of all integers between 24 and 3e6 satisfying conditions 1-3 with $M_0=24$ for k≥3824, and $M_0=16$ for k<3824. $M_1=M_2=24$, $Z_1=8448$, $Z_2=3840$:

[24 32 40 48 56 64 72 80 88 96 104 112 120 128 136 144 152 160 168 176 184 192 200 208 216 224 232 240 248 256 264 272 280 288 296 304 312 320 328 336 344 352 360 368 376 384 392 400 408 416 424 432 440 448 456 464 472 480 488 496 504 512 520 528 536 544 552 560 568 576 584 592

600 608 616 624 632 640 648 656 664 672 680 688 696 704
712 720 728 736 744 752 760 768 776 784 792 800 808 816
824 832 840 848 856 864 872 880 888 896 904 912 920 928
936 944 952 960 968 976 984 992 1000 1008 1016 1024
1032 1040 1048 1056 1064 1072 1080 1088 1096 1104 1112
1120 1128 1136 1144 1152 1160 1168 1176 1184 1192 1200
1208 1216 1224 1232 1240 1248 1256 1264 1272 1280 1288
1296 1304 1312 1320 1328 1336 1344 1352 1360 1368 1376
1384 1392 1400 1408 1416 1424 1432 1440 1448 1456 1464
1472 1480 1488 1496 1504 1512 1520 1528 1536 1544 1552
1560 1568 1576 1584 1592 1600 1608 1616 1624 1632 1640
1648 1656 1664 1672 1680 1688 1696 1704 1712 1720 1728
1736 1744 1752 1760 1768 1776 1784 1792 1800 1808 1816
1824 1832 1840 1848 1856 1864 1872 1880 1888 1896 1904
1912 1920 1928 1936 1944 1952 1960 1968 1976 1984 1992
2000 2008 2016 2024 2032 2040 2048 2056 2064 2072 2080
2088 2096 2104 2112 2120 2128 2136 2144 2152 2160 2168
2176 2184 2192 2200 2208 2216 2224 2232 2240 2248 2256
2264 2272 2280 2288 2296 2304 2312 2320 2328 2336 2344
2352 2360 2368 2376 2384 2392 2400 2408 2416 2424 2432
2440 2448 2456 2464 2472 2480 2488 2496 2504 2512 2520
2528 2536 2544 2552 2560 2568 2576 2584 2592 2600 2608
2616 2624 2632 2640 2648 2656 2664 2672 2680 2688 2696
2704 2712 2720 2728 2736 2744 2752 2760 2768 2776 2784
2792 2800 2808 2816 2824 2832 2840 2848 2856 2864 2872
2880 2888 2896 2904 2912 2920 2928 2936 2944 2952 2960
2968 2976 2984 2992 3000 3008 3016 3024 3032 3040 3048
3056 3064 3072 3080 3088 3096 3104 3112 3120 3128 3136
3144 3152 3160 3168 3176 3184 3192 3200 3208 3216 3224
3232 3240 3248 3256 3264 3272 3280 3288 3296 3304 3312
3320 3328 3336 3344 3352 3360 3368 3376 3384 3392 3400
3408 3416 3424 3432 3440 3448 3456 3464 3472 3480 3488
3496 3504 3512 3520 3528 3536 3544 3552 3560 3568 3576
3584 3592 3600 3608 3616 3624 3632 3640 3648 3656 3664
3672 3680 3688 3696 3704 3712 3720 3728 3736 3744 3752
3760 3768 3776 3784 3792 3800 3808 3816 3824 3832 3840
3848 3856 3864 3872 3880 3888 3896 3904 3912 3920 3928
3936 3944 3952 3960 3968 3976 3984 3992 4000 4008 4016
4024 4032 4040 4048 4056 4064 4072 4080 4088 4096 4104
4112 4120 4128 4136 4144 4152 4160 4168 4176 4184 4192
4200 4208 4216 4224 4232 4240 4248 4256 4264 4272 4280
4288 4296 4304 4312 4320 4328 4336 4344 4352 4360 4368
4376 4384 4392 4400 4408 4416 4424 4432 4440 4448 4456
4464 4472 4480 4488 4496 4504 4512 4520 4528 4536 4544
4552 4560 4568 4576 4584 4592 4600 4608 4616 4624 4632
4640 4648 4656 4664 4672 4680 4688 4696 4704 4712 4720
4728 4736 4744 4752 4760 4768 4776 4784 4792 4800 4808
4816 4824 4832 4840 4848 4856 4864 4872 4880 4888 4896
4904 4912 4920 4928 4936 4944 4952 4960 4968 4976 4984
4992 5000 5008 5016 5024 5032 5040 5048 5056 5064 5072
5080 5088 5096 5104 5112 5120 5128 5136 5144 5152 5160
5168 5176 5184 5192 5200 5208 5216 5224 5232 5240 5248
5256 5264 5272 5280 5288 5296 5304 5312 5320 5328 5336
5344 5352 5360 5368 5376 5384 5392 5400 5408 5416 5424
5432 5440 5448 5456 5464 5472 5480 5488 5496 5504 5512
5520 5528 5536 5544 5552 5560 5568 5576 5584 5592 5600
5608 5616 5624 5632 5640 5648 5656 5664 5672 5680 5688
5696 5704 5712 5720 5728 5736 5744 5752 5760 5768 5776
5784 5792 5800 5808 5816 5824 5832 5840 5848 5856 5864
5872 5880 5888 5896 5904 5912 5920 5928 5936 5944 5952
5960 5968 5976 5984 5992 6000 6008 6016 6024 6032 6040
6048 6056 6064 6072 6080 6088 6096 6104 6112 6120 6128
6136 6144 6152 6160 6168 6176 6184 6192 6200 6208 6216
6224 6232 6240 6248 6256 6264 6272 6280 6288 6296 6304
6312 6320 6328 6336 6344 6352 6360 6368 6376 6384 6392
6400 6408 6416 6424 6432 6440 6448 6456 6464 6472 6480
6488 6496 6504 6512 6520 6528 6536 6544 6552 6560 6568
6576 6584 6592 6600 6608 6616 6624 6632 6640 6648 6656
6664 6672 6680 6688 6696 6704 6712 6720 6728 6736 6744
6752 6760 6768 6776 6784 6792 6800 6808 6816 6824 6832
6840 6848 6856 6864 6872 6880 6888 6896 6904 6912 6920
6928 6936 6944 6952 6960 6968 6976 6984 6992 7000 7008
7016 7024 7032 7040 7048 7056 7064 7072 7080 7088 7096
7104 7112 7120 7128 7136 7144 7152 7160 7168 7176 7184
7192 7200 7208 7216 7224 7232 7240 7248 7256 7264 7272
7280 7288 7296 7304 7312 7320 7328 7336 7344 7352 7360
7368 7376 7384 7392 7400 7408 7416 7424 7432 7440 7448
7456 7464 7472 7480 7488 7496 7504 7512 7520 7528 7536
7544 7552 7560 7568 7576 7584 7592 7600 7608 7632 7656
7680 7704 7728 7752 7776 7800 7824 7848 7872 7896 7920
7944 7968 7992 8016 8040 8064 8088 8112 8136 8160 8184
8208 8232 8256 8280 8304 8328 8352 8376 8400 8424 8448
8472 8496 8520 8544 8568 8592 8616 8640 8664 8688 8712
8736 8760 8784 8808 8832 8856 8880 8904 8928 8952 8976
9000 9024 9048 9072 9096 9120 9144 9168 9192 9216 9240
9264 9288 9312 9336 9360 9384 9408 9432 9456 9480 9504
9528 9552 9576 9600 9624 9648 9672 9696 9720 9744 9768
9792 9816 9840 9864 9888 9912 9936 9960 9984 10008
10032 10056 10080 10104 10128 10152 10176 10200
10224 10248 10272 10296 10320 10344 10368 10392
10416 10440 10464 10488 10512 10536 10560 10584
10608 10632 10656 10680 10704 10728 10752 10776
10800 10824 10848 10872 10896 10920 10944 10968
10992 11016 11040 11064 11088 11112 11136 11160 11184
11208 11232 11256 11280 11304 11328 11352 11376 11400
11424 11432 11440 11448 11456 11464 11472 11480 11488
11496 11504 11512 11520 11528 11536 11544 11552 11560
11568 11576 11584 11592 11600 11608 11616 11624 11632
11640 11648 11656 11664 11672 11680 11688 11696 11704
11712 11720 11728 11736 11744 11752 11760 11768 11776
11784 11792 11800 11808 11816 11824 11832 11840 11848
11856 11864 11872 11880 11888 11896 11904 11912 11920
11928 11936 11944 11952 11960 11968 11976 11984 11992
12000 12008 12016 12024 12032 12040 12048 12056
12064 12072 12080 12088 12096 12104 12112 12120
12128 12136 12144 12152 12160 12168 12176 12184
12192 12200 12208 12216 12224 12232 12240 12248
12256 12264 12272 12280 12288 12296 12304 12312
12320 12328 12336 12344 12352 12360 12368 12376
12384 12392 12400 12408 12416 12424 12432 12440
12448 12456 12464 12472 12480 12488 12496 12504
12512 12520 12528 12536 12544 12552 12560 12568
12576 12584 12592 12600 12608 12616 12624 12632
12640 12648 12656 12664 12672 12680 12688 12696
12704 12712 12720 12728 12736 12744 12752 12760
12768 12776 12784 12792 12800 12808 12816 12824
12832 12840 12848 12856 12864 12872 12880 12888
12896 12904 12912 12920 12928 12936 12944 12952
12960 12968 12976 12984 12992 13000 13008 13016
13024 13032 13040 13048 13056 13064 13072 13080
13088 13096 13104 13112 13120 13128 13136 13144
13152 13160 13168 13176 13184 13192 13200 13208
13216 13224 13232 13240 13248 13256 13264 13272
13280 13288 13296 13304 13312 13320 13328 13336
13344 13352 13360 13368 13376 13384 13392 13400
13408 13416 13424 13432 13440 13448 13456 13464
13472 13480 13488 13496 13504 13512 13520 13528
13536 13544 13552 13560 13568 13576 13584 13592
13600 13608 13616 13624 13632 13640 13648 13656
13664 13672 13680 13688 13696 13704 13712 13720
13728 13736 13744 13752 13760 13768 13776 13784
13792 13800 13808 13816 13824 13832 13840 13848
13856 13864 13872 13880 13888 13896 13904 13912
13920 13928 13936 13944 13952 13960 13968 13976

| | | | | | | | | | | | | | | |
|---|---|---|---|---|---|---|---|---|---|---|---|---|---|---|
| 13984 | 13992 | 14000 | 14008 | 14016 | 14024 | 14032 | 14040 | 27664 | 27672 | 27680 | 27688 | 27696 | 27704 | 27712 | 27720 |
| 14048 | 14056 | 14064 | 14072 | 14080 | 14088 | 14096 | 14104 | 27728 | 27736 | 27744 | 27752 | 27760 | 27768 | 27776 | 27784 |
| 14112 | 14120 | 14128 | 14136 | 14144 | 14152 | 14160 | 14168 | 27792 | 27800 | 27808 | 27816 | 27824 | 27832 | 27840 | 27848 |
| 14176 | 14184 | 14192 | 14200 | 14208 | 14216 | 14224 | 14232 | 27856 | 27864 | 27872 | 27880 | 27888 | 27896 | 27904 | 27912 |
| 14240 | 14248 | 14256 | 14264 | 14272 | 14280 | 14288 | 14296 | 27920 | 27928 | 27936 | 27944 | 27952 | 27960 | 27968 | 27976 |
| 14304 | 14312 | 14320 | 14328 | 14336 | 14344 | 14352 | 14360 | 27984 | 27992 | 28000 | 28008 | 28016 | 28024 | 28032 | 28040 |
| 14368 | 14376 | 14384 | 14392 | 14400 | 14408 | 14416 | 14424 | 28048 | 28056 | 28064 | 28072 | 28080 | 28088 | 28096 | 28104 |
| 14432 | 14440 | 14448 | 14456 | 14464 | 14472 | 14480 | 14488 | 28112 | 28120 | 28128 | 28136 | 28144 | 28152 | 28160 | 28168 |
| 14496 | 14504 | 14512 | 14520 | 14528 | 14536 | 14544 | 14552 | 28176 | 28184 | 28192 | 28200 | 28208 | 28216 | 28224 | 28232 |
| 14560 | 14568 | 14576 | 14584 | 14592 | 14600 | 14608 | 14616 | 28240 | 28248 | 28256 | 28264 | 28272 | 28280 | 28288 | 28296 |
| 14624 | 14632 | 14640 | 14648 | 14656 | 14664 | 14672 | 14680 | 28304 | 28312 | 28320 | 28328 | 28336 | 28344 | 28352 | 28360 |
| 14688 | 14696 | 14704 | 14712 | 14720 | 14728 | 14736 | 14744 | 28368 | 28376 | 28384 | 28392 | 28400 | 28408 | 28416 | 28424 |
| 14752 | 14760 | 14768 | 14776 | 14784 | 14792 | 14800 | 14808 | 28432 | 28440 | 28448 | 28456 | 28464 | 28472 | 28480 | 28488 |
| 14816 | 14824 | 14832 | 14840 | 14848 | 14856 | 14864 | 14872 | 28496 | 28504 | 28512 | 28520 | 28528 | 28536 | 28544 | 28552 |
| 14880 | 14888 | 14896 | 14904 | 14912 | 14920 | 14928 | 14936 | 28560 | 28568 | 28576 | 28584 | 28592 | 28600 | 28608 | 28616 |
| 14944 | 14952 | 14960 | 14968 | 14976 | 14984 | 14992 | 15000 | 28624 | 28632 | 28640 | 28648 | 28656 | 28664 | 28672 | 28680 |
| 15008 | 15016 | 15024 | 15032 | 15040 | 15048 | 15056 | 15064 | 28688 | 28696 | 28704 | 28712 | 28720 | 28728 | 28736 | 28744 |
| 15072 | 15080 | 15088 | 15096 | 15104 | 15112 | 15120 | 15128 | 28752 | 28760 | 28768 | 28776 | 28784 | 28792 | 28800 | 28808 |
| 15136 | 15144 | 15152 | 15160 | 15168 | 15176 | 15184 | 15192 | 28816 | 28824 | 28832 | 28840 | 28848 | 28856 | 28864 | 28872 |
| 15200 | 15208 | 15216 | 15224 | 15232 | 15240 | 15256 | 15296 | 28880 | 28888 | 28896 | 28904 | 28912 | 28920 | 28928 | 28936 |
| 15336 | 15376 | 15416 | 15456 | 15496 | 15536 | 15576 | 15616 | 28944 | 28952 | 28960 | 28968 | 28976 | 28984 | 28992 | 29000 |
| 15656 | 15696 | 15736 | 15776 | 15816 | 15856 | 15896 | 15936 | 29008 | 29016 | 29024 | 29032 | 29040 | 29048 | 29056 | 29064 |
| 15976 | 16016 | 16056 | 16096 | 16136 | 16176 | 16216 | 16256 | 29072 | 29080 | 29088 | 29096 | 29104 | 29112 | 29120 | 29128 |
| 16296 | 16336 | 16376 | 16416 | 16456 | 16496 | 16536 | 16576 | 29136 | 29144 | 29152 | 29160 | 29168 | 29176 | 29184 | 29192 |
| 16616 | 16656 | 16696 | 16736 | 16776 | 16816 | 16896 | 17016 | 29200 | 29208 | 29216 | 29224 | 29232 | 29240 | 29248 | 29256 |
| 17136 | 17256 | 17376 | 17496 | 17616 | 17736 | 17856 | 17976 | 29264 | 29272 | 29280 | 29288 | 29296 | 29304 | 29312 | 29320 |
| 18096 | 18216 | 18336 | 18456 | 18576 | 18696 | 18816 | 18936 | 29328 | 29336 | 29344 | 29352 | 29360 | 29368 | 29376 | 29384 |
| 19056 | 19080 | 19104 | 19128 | 19152 | 19176 | 19200 | 19224 | 29392 | 29400 | 29408 | 29416 | 29424 | 29432 | 29440 | 29448 |
| 19248 | 19272 | 19296 | 19320 | 19344 | 19368 | 19392 | 19416 | 29456 | 29464 | 29472 | 29480 | 29488 | 29496 | 29504 | 29512 |
| 19440 | 19464 | 19488 | 19512 | 19536 | 19560 | 19584 | 19608 | 29520 | 29528 | 29536 | 29544 | 29552 | 29560 | 29568 | 29576 |
| 19632 | 19656 | 19680 | 19704 | 19728 | 19752 | 19776 | 19800 | 29584 | 29592 | 29600 | 29608 | 29616 | 29624 | 29632 | 29640 |
| 19824 | 19848 | 19872 | 19896 | 19920 | 19944 | 19968 | 19992 | 29648 | 29656 | 29664 | 29672 | 29680 | 29688 | 29696 | 29704 |
| 20016 | 20040 | 20064 | 20088 | 20112 | 20136 | 20160 | 20184 | 29712 | 29720 | 29728 | 29736 | 29744 | 29752 | 29760 | 29768 |
| 20208 | 20232 | 20256 | 20280 | 20304 | 20328 | 20352 | 20376 | 29776 | 29784 | 29792 | 29800 | 29808 | 29816 | 29824 | 29832 |
| 20400 | 20424 | 20448 | 20472 | 20496 | 20520 | 20544 | 20568 | 29840 | 29848 | 29856 | 29864 | 29872 | 29880 | 29888 | 29896 |
| 20592 | 20616 | 20640 | 20664 | 20688 | 20712 | 20736 | 20760 | 29904 | 29912 | 29920 | 29928 | 29936 | 29944 | 29952 | 29960 |
| 20784 | 20808 | 20832 | 20856 | 20880 | 20904 | 20928 | 20952 | 29968 | 29976 | 29984 | 29992 | 30000 | 30008 | 30016 | 30024 |
| 20976 | 21000 | 21024 | 21048 | 21072 | 21096 | 21120 | 21144 | 21168 | 30032 | 30040 | 30048 | 30056 | 30064 | 30072 | 30080 | 30088 |
| 21192 | 21216 | 21240 | 21264 | 21288 | 21312 | 21336 | 21360 | 30096 | 30104 | 30112 | 30120 | 30128 | 30136 | 30144 | 30152 |
| 21384 | 21408 | 21432 | 21456 | 21480 | 21504 | 21528 | 21552 | 30160 | 30168 | 30176 | 30184 | 30192 | 30200 | 30208 | 30216 |
| 21576 | 21600 | 21624 | 21648 | 21672 | 21696 | 21720 | 21744 | 30224 | 30232 | 30240 | 30248 | 30256 | 30264 | 30272 | 30280 |
| 21768 | 21792 | 21816 | 21840 | 21864 | 21888 | 21912 | 21936 | 30288 | 30296 | 30304 | 30312 | 30320 | 30328 | 30336 | 30344 |
| 21960 | 21984 | 22008 | 22032 | 22056 | 22080 | 22104 | 22128 | 30352 | 30360 | 30368 | 30376 | 30384 | 30392 | 30400 | 30408 |
| 22152 | 22176 | 22200 | 22224 | 22248 | 22272 | 22296 | 22320 | 30416 | 30424 | 30432 | 30440 | 30448 | 30456 | 30464 | 30472 |
| 22344 | 22368 | 22392 | 22416 | 22440 | 22464 | 22488 | 22512 | 30480 | 30488 | 30496 | 30504 | 30576 | 30648 | 30720 | 30792 |
| 22536 | 22560 | 22584 | 22608 | 22632 | 22656 | 22680 | 22704 | 30864 | 30936 | 31008 | 31080 | 31152 | 31224 | 31296 | 31368 |
| 22728 | 22752 | 22776 | 22800 | 22824 | 22848 | 22872 | 22992 | 31440 | 31512 | 31584 | 31656 | 31728 | 31800 | 31872 | 31944 |
| 23160 | 23328 | 23496 | 23664 | 23832 | 24000 | 24168 | 24336 | 32016 | 32088 | 32160 | 32232 | 32304 | 32376 | 32448 | 32520 |
| 24504 | 24672 | 24840 | 25008 | 25176 | 25288 | 25344 | 25400 | 32592 | 32664 | 32736 | 32808 | 32880 | 32952 | 33024 | 33096 |
| 25456 | 25512 | 25568 | 25624 | 25680 | 25736 | 25792 | 25848 | 33168 | 33240 | 33312 | 33384 | 33456 | 33528 | 33600 | 33672 |
| 25904 | 25960 | 26016 | 26072 | 26128 | 26184 | 26240 | 26296 | 33816 | 34176 | 34336 | 34376 | 34416 | 34456 | 34496 | 34536 |
| 26352 | 26408 | 26464 | 26520 | 26576 | 26632 | 26688 | 26696 | 34576 | 34616 | 34656 | 34696 | 34736 | 34776 | 34816 | 34856 |
| 26704 | 26712 | 26720 | 26728 | 26736 | 26744 | 26752 | 26760 | 34896 | 34936 | 34976 | 35016 | 35056 | 35096 | 35136 | 35176 |
| 26768 | 26776 | 26784 | 26792 | 26800 | 26808 | 26816 | 26824 | 35216 | 35256 | 35296 | 35336 | 35376 | 35416 | 35456 | 35496 |
| 26832 | 26840 | 26848 | 26856 | 26864 | 26872 | 26880 | 26888 | 35536 | 35576 | 35616 | 35656 | 35696 | 35736 | 35776 | 35816 |
| 26896 | 26904 | 26912 | 26920 | 26928 | 26936 | 26944 | 26952 | 35856 | 35896 | 35936 | 35976 | 36016 | 36056 | 36096 | 36136 |
| 26960 | 26968 | 26976 | 26984 | 26992 | 27000 | 27008 | 27016 | 36176 | 36216 | 36256 | 36296 | 36336 | 36376 | 36416 | 36456 |
| 27024 | 27032 | 27040 | 27048 | 27056 | 27064 | 27072 | 27080 | 36496 | 36536 | 36576 | 36616 | 36656 | 36696 | 36736 | 36776 |
| 27088 | 27096 | 27104 | 27112 | 27120 | 27128 | 27136 | 27144 | 36816 | 36856 | 36896 | 36936 | 36976 | 37016 | 37056 | 37096 |
| 27152 | 27160 | 27168 | 27176 | 27184 | 27192 | 27200 | 27208 | 37136 | 37176 | 37216 | 37256 | 37296 | 37336 | 37376 | 37416 |
| 27216 | 27224 | 27232 | 27240 | 27248 | 27256 | 27264 | 27272 | 37456 | 37496 | 37536 | 37576 | 37616 | 37656 | 37696 | 37736 |
| 27280 | 27288 | 27296 | 27304 | 27312 | 27320 | 27328 | 27336 | 37776 | 37816 | 37856 | 37896 | 37936 | 37976 | 38016 | 38056 |
| 27344 | 27352 | 27360 | 27368 | 27376 | 27384 | 27392 | 27400 | 38096 | 38136 | 38256 | 38696 | 39136 | 39576 | 40016 | 40456 |
| 27408 | 27416 | 27424 | 27432 | 27440 | 27448 | 27456 | 27464 | 40896 | 41336 | 41776 | 41976 | 42120 | 42144 | 42168 |
| 27472 | 27480 | 27488 | 27496 | 27504 | 27512 | 27520 | 27528 | 42192 | 42216 | 42240 | 42264 | 42288 | 42312 | 42336 | 42360 |
| 27536 | 27544 | 27552 | 27560 | 27568 | 27576 | 27584 | 27592 | 42384 | 42408 | 42432 | 42456 | 42480 | 42504 | 42528 | 42552 |
| 27600 | 27608 | 27616 | 27624 | 27632 | 27640 | 27648 | 27656 | 42576 | 42600 | 42624 | 42648 | 42672 | 42696 | 42720 | 42744 |

42768 42792 42816 42840 42864 42888 42912 42936
42960 42984 43008 43032 43056 43080 43104 43128
43152 43176 43200 43224 43248 43272 43296 43320
43344 43368 43392 43416 43440 43464 43488 43512
43536 43560 43584 43608 43632 43656 43680 43704
43728 43752 43776 43800 43824 43848 43872 43896
43920 43944 43968 43992 44016 44040 44064 44088
44112 44136 44160 44184 44208 44232 44256 44280
44304 44328 44352 44376 44400 44424 44448 44472
44496 44520 44544 44568 44592 44616 44640 44664
44688 44712 44736 44760 44784 44808 44832 44856
44880 44904 44928 44952 44976 45000 45024 45048
45072 45096 45120 45144 45168 45192 45216 45240
45264 45288 45312 45336 45360 45384 45408 45432
45456 45480 45504 45528 45552 45576 45600 45624
45648 45672 45696 45720 45744 45768 45840 46152
46464 46776 47088 47400 47712 48024 48336 48648
48960 49272 49584 49704 49872 50040 50208 50376
50544 50600 50656 50712 50768 50824 50880 50936
50992 51048 51104 51160 51216 51272 51328 51384
51440 51496 51552 51608 51664 51720 51776 51832
51888 51944 52000 52056 52112 52168 52224 52280
52336 52392 52448 52504 52560 52616 52672 52728
52784 52840 52896 52952 53008 53064 53120 53176
53232 53288 53344 53400 53736 54576 55416 56256
57096 57320 57432 57544 57656 57768 57880 57992
58104 58216 58328 58440 58552 58664 58776 58888
58952 58968 58984 59000 59016 59032 59048 59064
59080 59096 59112 59128 59144 59160 59176 59192
59208 59224 59240 59256 59272 59288 59304 59320
59336 59352 59368 59384 59400 59416 59432 59448
59464 59480 59496 59512 59528 59544 59560 59576
59592 59608 59624 59640 59656 59672 59688 59704
59720 59736 59752 59768 59784 59800 59816 59832
59848 59864 59880 59896 59912 59928 59944 59960
59976 59992 60008 60024 60040 60056 60072 60088
60104 60120 60136 60152 60168 60184 60200 60216
60232 60248 60264 60280 60296 60312 60328 60344
60360 60376 60392 60408 60424 60440 60456 60472
60488 60504 60520 60536 60552 60568 60584 60600
60616 60632 60648 60664 60680 60696 60712 60728
60744 60760 60776 60792 60808 60824 60840 60856
60872 60888 60904 60920 60936 60952 60968 60984
61000 61016 61032 61040 61176 61312 61448 61584
61720 61856 61992 62128 62264 62400 62536 62672
62808 62944 63080 63216 63352 63488 63624 63760
63896 64032 64168 64304 64440 64576 64712 64848
64920 64992 65064 65136 65208 65280 65352 65424
65496 65568 65640 65712 65784 65856 65928 66000
66072 66144 66216 66288 66360 66432 66504 66576
66648 66720 66792 66864 66936 67008 67080 67152
67224 67296 67368 67440 67512 67584 67656 67728
67800 67872 67944 68016 68088 68160 68232 68304
68376 68448 68520 68592 68664 69744 71112 72480
72696 73056 73416 73776 74136 74496 74856 75216
75576 75816 75856 75896 75936 75976 76016 76056
76096 76136 76176 76216 76256 76296 76416 77256
78096 78936 79776 80496 80936 81376 81816 82256
82696 83136 83576 84984 87008 87888 88152 88416
88680 88944 89208 89472 89736 90000 90264 90528
90792 91056 91320 92376 92976 93576 94176 94776
95376 95448 95760 96072 96384 96696 97008 97320
97632 97944 98256 98568 98880 99192 99336 99552
99768 99984 100200 100416 100632 100848 101064
103352 104080 104808 105536 106264 108552 110408
110856 111696 112536 113376 114216 114552 116288
118536 119016 119496 119976 120456 120936 121416
121896 122736 124056 125376 126456 126728 127000
127272 127544 127816 128088 128360 128632 128904
129176 129448 129720 129896 130456 131016 131576
132136 132696 133256 133608 133752 133896 134040
134184 134328 134472 134616 134760 135840 137064
140872 142096 143616 144984 145056 145992 146928
147864 148800 149016 149376 149736 150096 150456
150816 151176 151536 151976 155776 159576 161656
163376 164096 164536 164976 165416 165856 166296
166736 167176 167616 168096 168456 168816 171336
173856 177824 179496 180024 180552 181080 181608
182136 182664 188576 193776 194184 194592 194664
194976 195288 195600 195912 196224 196536 196848
197160 197472 197784 198096 198408 199680 200952
205176 206776 208976 209976 211096 211824 212552
213280 219216 225696 226776 227616 228456 232264
234336 241256 243112 244896 246456 248016 248136
249456 250776 257152 262728 264296 265416 266536
268072 271632 272424 273216 274008 281768 285576
287256 292576 294816 295752 296688 297624 301440
301656 302376 303096 304856 315376 319176 330576
332176 332616 333056 333496 333936 334376 334816
335256 335696 347232 347736 355672 359456 363240
364296 365352 367024 376176 377976 395904 396216
396840 398136 399816 401928 414176 417976 422664
432720 438816 442632 446448 454656 455376 456696
459776 464552 468360 470432 478776 486248 500256
501576 502896 518544 530856 533096 543376 548040
567368 571176 576816 585176 599088 602904 607336
614928 626976 634576 638376 666376 667896 668776
669656 670536 671416 699360 710576 729384 752376
791832 794176 797976 835976 838176 839776 856776
877776 885288 889104 892920 904368 915576 936744
940552 997672 1001480 1004496 1005816 1007136
1037112 1066776 1138568 1142376 1173456 1187760
1205832 1331760 1335576 1339392 1341096 1342856
1427976 1508736 1583688 1676376 1678576 1713576
1778232 1782048 1785864 1831176 2014296 2133576
2232336 2671176 2674992 2678808 2746776]

Figure 6:
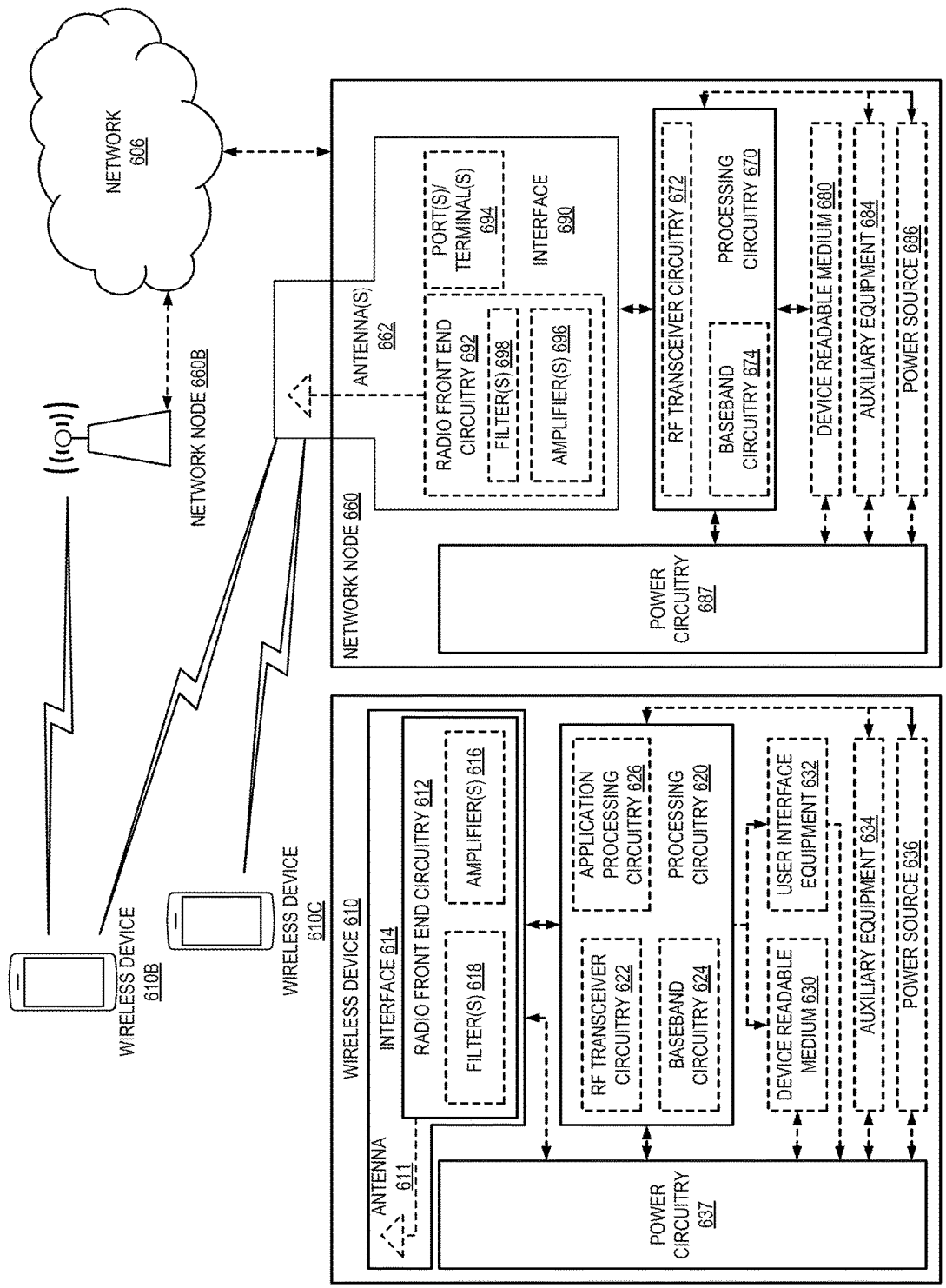
FIG. 6 illustrates an example wireless network.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660B, and WDs 610, 610B, and 610C. In practice, a wireless network may further include any additional elements suitable to support communication between wireless devices or between a wireless device and another communication device, such as a landline telephone, a service provider, or any other network node or end device. Of the illustrated components, network node 660 and Wireless Device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Forth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

Network 606 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio access points), Base Stations (BSs) (e.g., radio base stations, Node Bs, enhanced or evolved Node Bs (eNBs) and NR base stations (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such remote radio units may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entity (MMEs)), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple Random Access Memory (RAM) modules).

Similarly, network node 660 may be composed of multiple physically separate components (e.g., a Node B component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, network node 660 may be configured to support multiple Radio Access Technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, Central Processing Unit (CPU), Digital Signal Processor (DSP), Application Specific Integrated Circuit (ASIC), Field Programmable Gate Array (FPGA), or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a System on a Chip (SOC).

In some embodiments, processing circuitry 670 may include one or more of Radio Frequency (RF) transceiver circuitry 672 and baseband processing circuitry 674. In some embodiments, RF transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units.

In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signaling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, WD refers to a device capable, configured, arranged and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless cameras, a gaming console or device, a music storage device, a playback appliance, a wearable terminal device, a wireless endpoint, a mobile station, a tablet, a laptop, a Laptop Embedded Equipment (LEE), a Laptop Mounted Equipment (LME), a smart device, a wireless Customer Premise Equipment (CPE), a vehicle-mounted wireless terminal device, etc. A WD may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine Type Communication (MTC) device. As one particular example, the WD may be a UE implementing the 3GPP Narrowband IoT (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD or UE may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a Universal Serial Bus (USB) port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
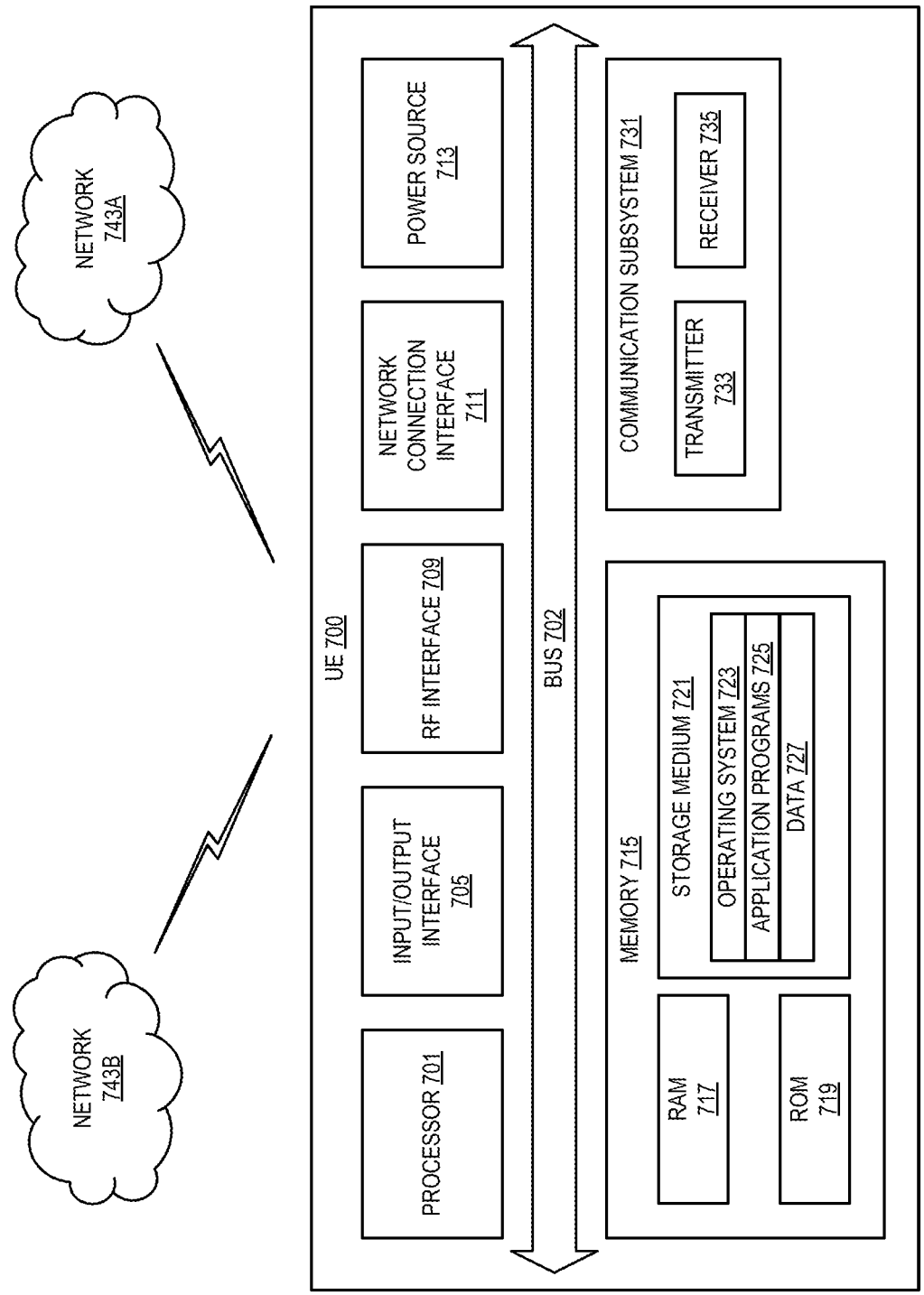
FIG. 7 illustrates one embodiment of a UE in accordance with various aspects described herein.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 7200 may be any UE identified by the 3GPP, including a NB-IoT UE, a MTC UE, and/or an enhanced MTC (eMTC) UE. UE 700, as illustrated in FIG. 7, is one example of a WD configured for communication in accordance with one or more communication standards promulgated by the 3GPP, such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, RF interface 709, network connection interface 711, memory 715 including RAM 717, ROM 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or DSP, together with appropriate software; or any combination of the above. For example, the processing circuitry 701 may include two CPUs. Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743A. Network 743A may encompass wired and/or wireless networks such as a LAN, a WAN, a computer network, a wireless network, a telecommunications network, another like network or any combination thereof. For example, network 743A may comprise a Wi-Fi network. Network connection interface 711 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic Input and Output (I/O), startup, or reception of keystrokes from a keyboard that are stored in a non-volatile memory. Storage medium 721 may be configured to include memory such as RAM, ROM, Programmable ROM (PROM), Erasable Programmable ROM (EPROM), Electrically Erasable Programmable ROM (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as Redundant Array of Independent Disks (RAID), floppy disk drive, flash memory, USB flash drive, external hard disk drive, thumb drive, pen drive, key drive, High-Density Digital Versatile Disc (HD-DVD) optical disc drive, internal hard disk drive, Blu-Ray optical disc drive, Holographic Digital Data Storage (HDDS) optical disc drive, external mini Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743B using communication subsystem 731. Network 743A and network 743B may be the same network or networks or different network or networks. Communication subsystem 731 may be configured to include one or more transceivers used to communicate with network 743B. For example, communication subsystem 731 may be configured to include one or more transceivers used to communicate with one or more remote transceivers of another device capable of wireless communication such as another WD, UE, or base station of a Radio Access Network (RAN) according to one or more communication protocols, such as IEEE 802.7, Code Division Multiple Access (CDMA), Wideband Code Division Multiple Access (WCDMA), GSM, LTE, Universal Terrestrial Radio Access Network (UTRAN), WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the Global Positioning System (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a LAN, a WAN, a computer network, a wireless network, a telecommunications network, another like network or any combination thereof. For example, network 743B may be a cellular network, a Wi-Fi network, and/or a near-field network. Power source 713 may be configured to provide Alternating Current (AC) or Direct Current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
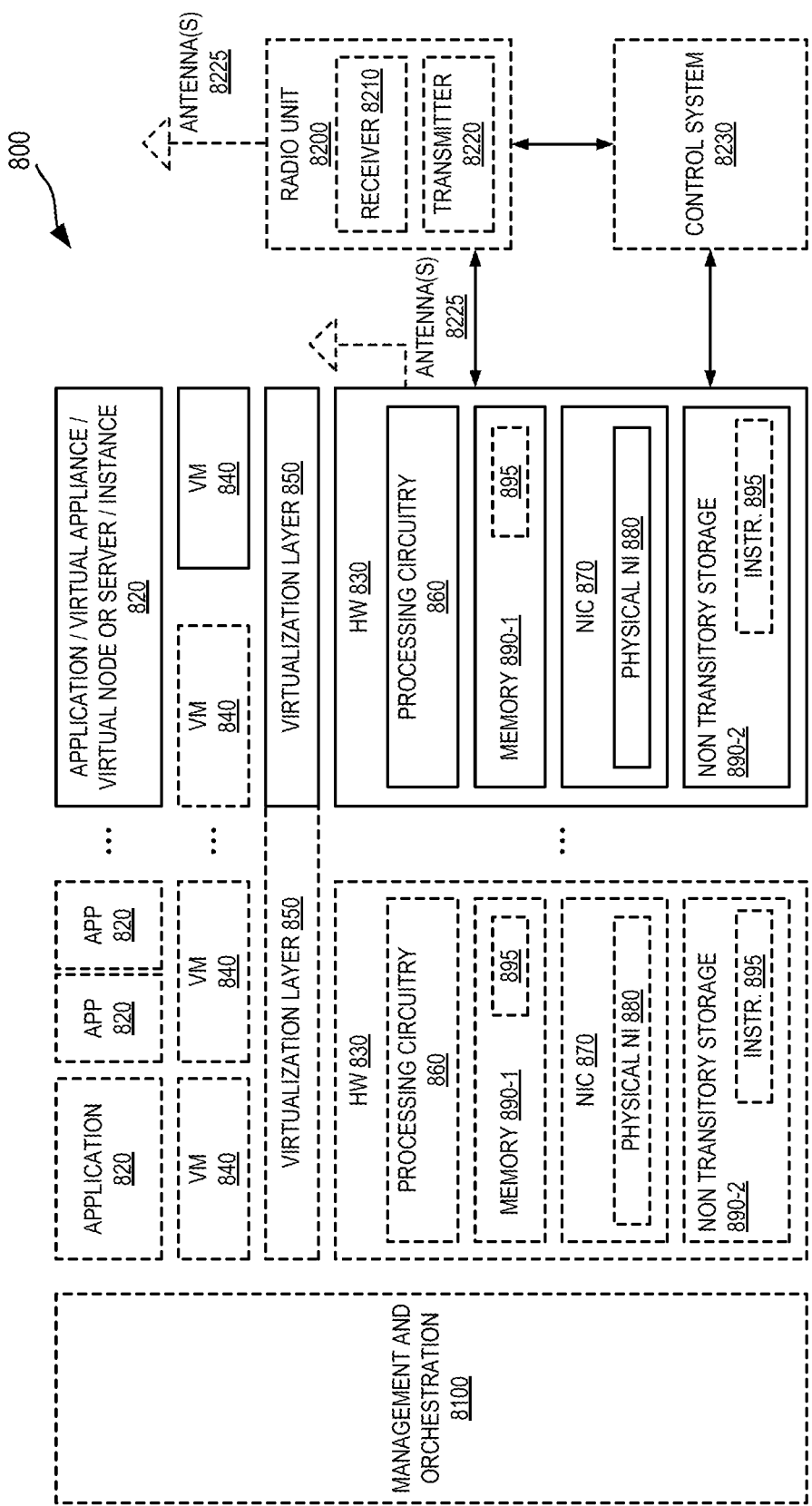
FIG. 8 is a schematic block diagram illustrating a virtualization environment in which functions implemented by some embodiments may be virtualized.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be Commercial Off-the-Shelf (COTS) processors, dedicated ASICs, or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more Network Interface Controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a Virtual Machine Monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g., such as in a data center or CPE) where many hardware nodes work together and are managed via Management and Orchestration (MANO) 8100, which, among others, oversees lifecycle management of applications 820.

Virtualization of the hardware is in some contexts referred to as Network Function Virtualization (NFV). NFV may be used to consolidate many network equipment types onto industry standard high volume server hardware, physical switches, and physical storage, which can be located in data centers, and CPE.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate Virtual Network Element (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signaling can be effected with the use of control system 8230 which may alternatively be used for communication between the hardware nodes 830 and radio units 8200.

Figure 9:
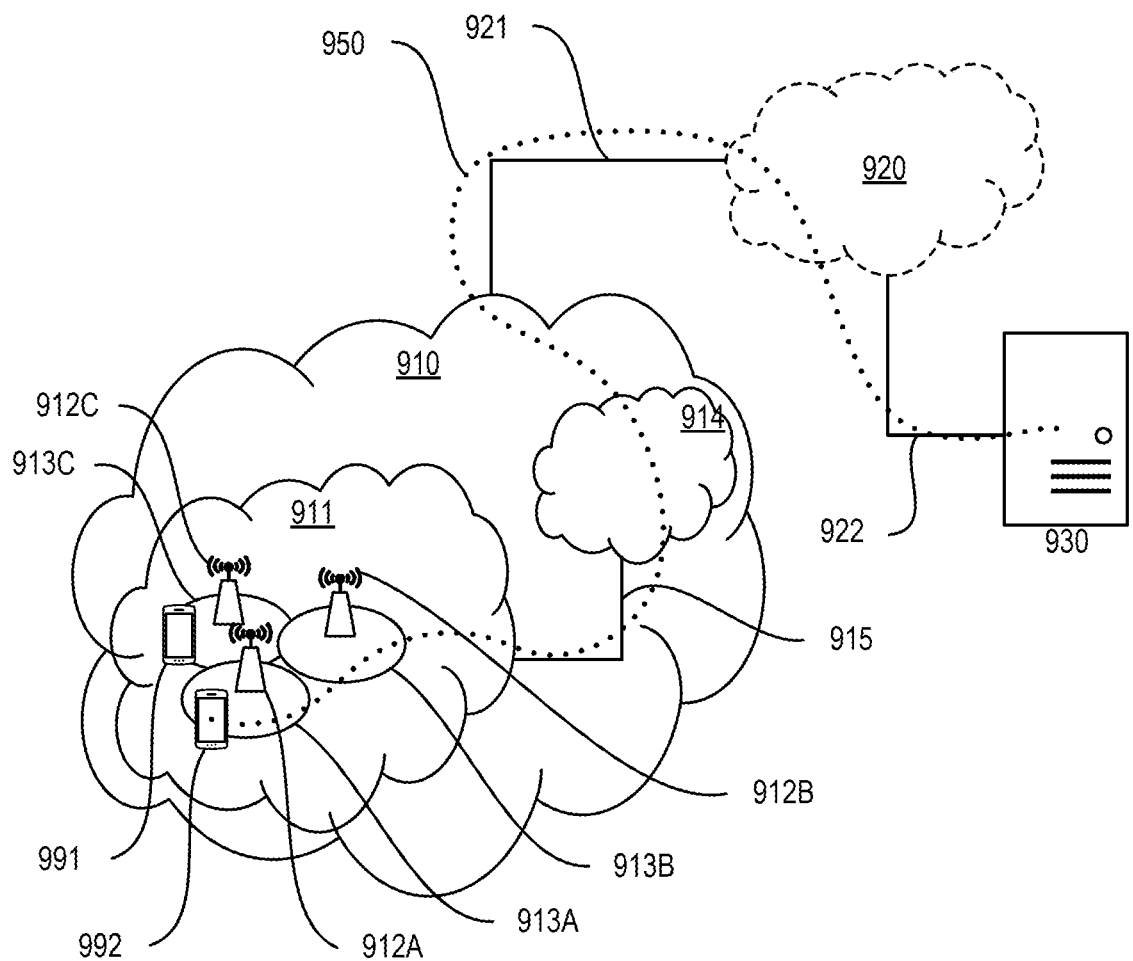
FIG. 9 illustrates a telecommunication network connected via an intermediate network to a host computer in accordance with some embodiments.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912A, 912B, 912C, such as Node Bs, eNBs, gNBs or other types of wireless access points, each defining a corresponding coverage area 913A, 913B, 913C. Each base station 912A, 912B, 912C is connectable to core network 914 over a wired or wireless connection 915. A first UE 991 located in coverage area 913C is configured to wirelessly connect to, or be paged by, the corresponding base station 912C. A second UE 992 in coverage area 913A is wirelessly connectable to the corresponding base station 912A. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more subnetworks (not shown).

The communication system of FIG. 9 as a whole enables connectivity between the connected UEs 991, 992 and host computer 930. The connectivity may be described as an Over-the-Top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, ASICs, FPGAs, or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, ASICs, FPGAs, or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, ASICs, FPGAs, or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
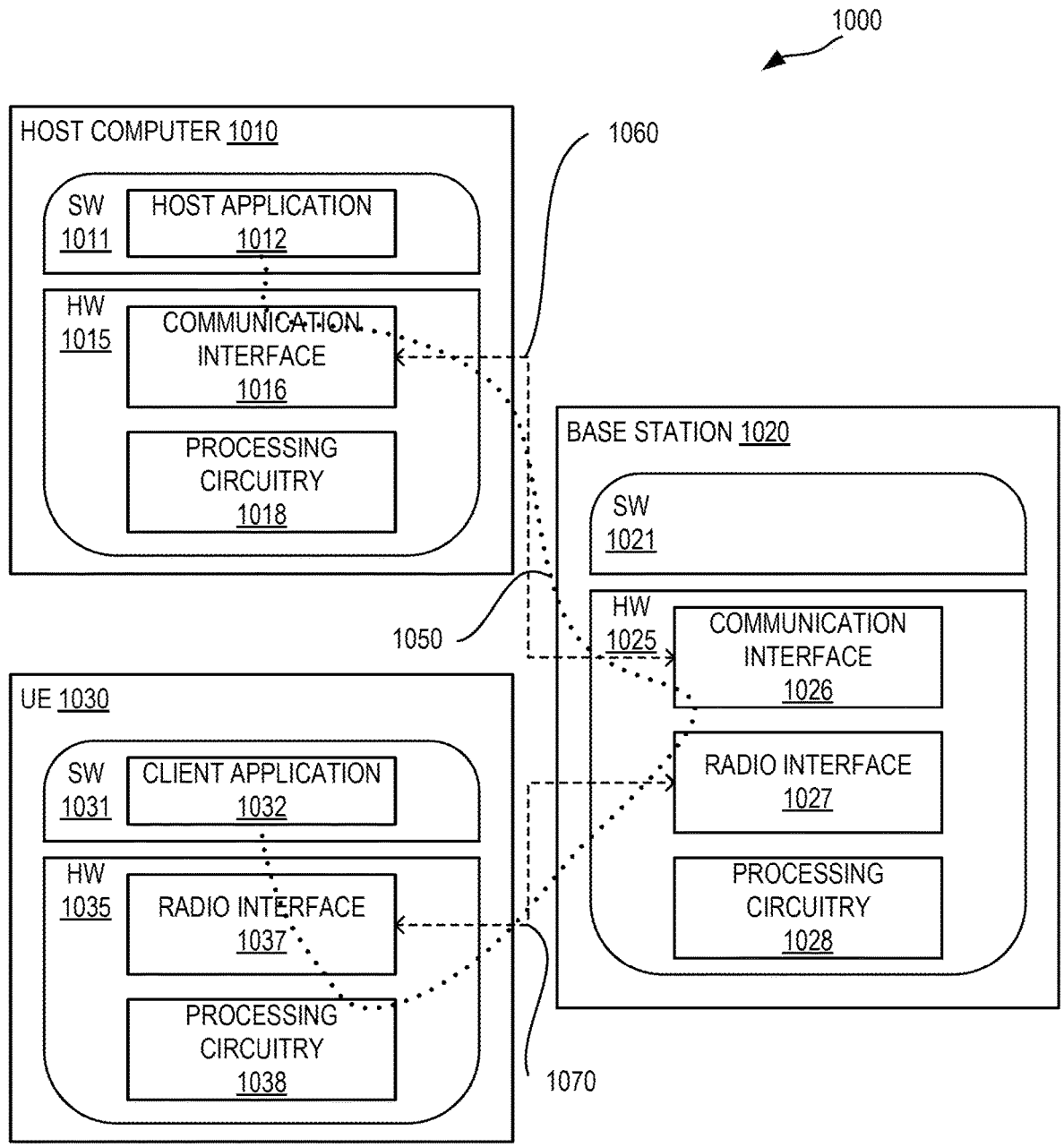
FIG. 10 illustrates a host computer communicating via a base station with a UE over a partially wireless connection in accordance with some embodiments.

It is noted that host computer 1010, base station 1020 and UE 1030 illustrated in FIG. 10 may be similar or identical to host computer 930, one of base stations 912A, 912B, 912C and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figures 11, 12:
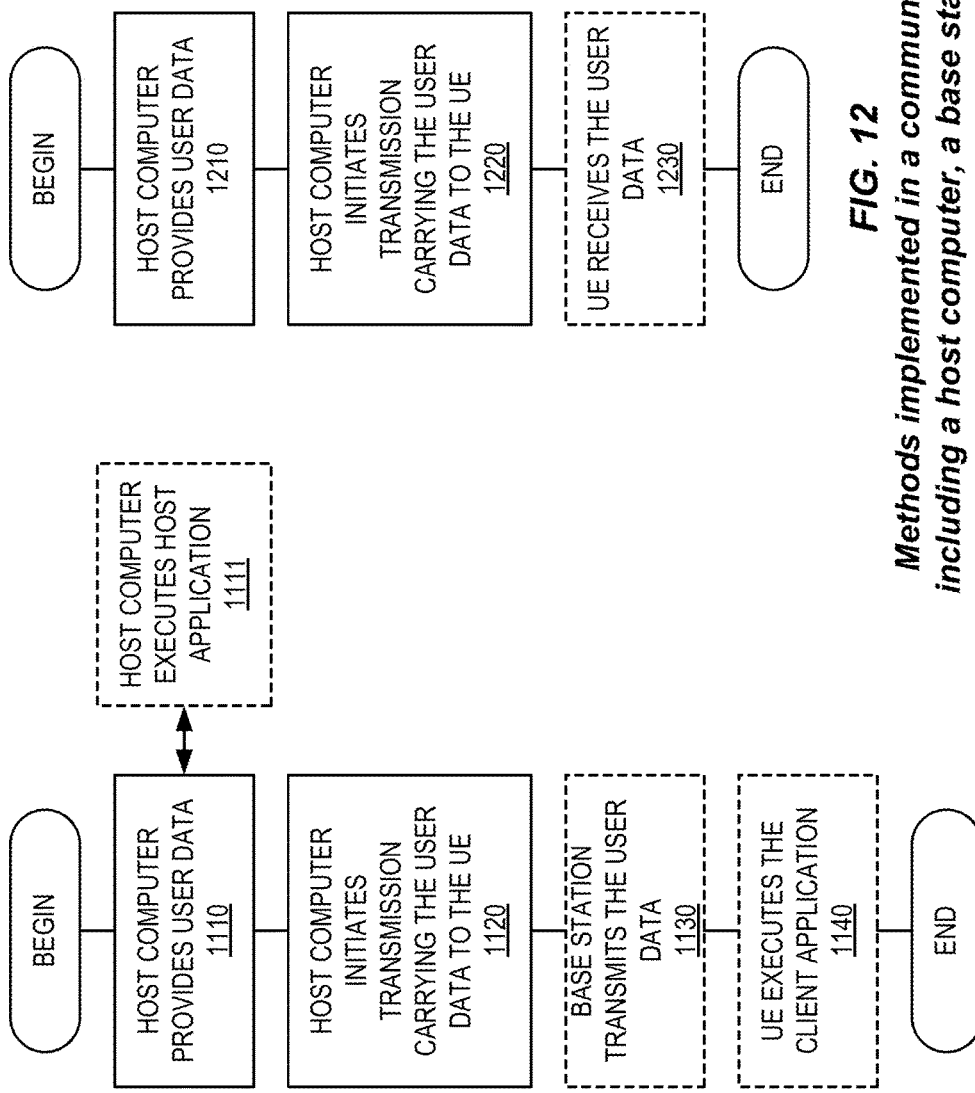
FIG. 11 is a flowchart illustrating a method implemented in a communication system in accordance with one embodiment.
FIG. 12 is a flowchart illustrating a method implemented in a communication system in accordance with one embodiment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Figure 15:
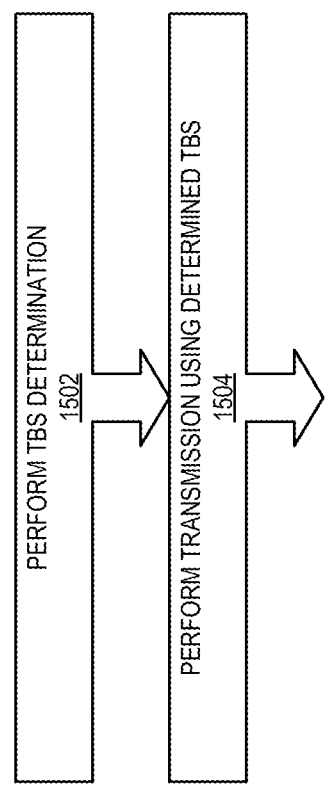
FIG. 15 depicts a method in accordance with particular embodiments.

FIG. 15 depicts a method in accordance with particular embodiments, the method comprises performing TBS determination as disclosed herein (e.g., in accordance with any of the embodiments described above) (step 1502) and performing transmission using the determined TBS (step 1504). Optionally, step 1504 comprises refraining from transmitting filler bits as described above. The method of FIG. 15 may be performed by, e.g., a network node such as, e.g., one of the network nodes 660 or by a wireless device such as, e.g., one of the wireless devices 610.

Figure 16:
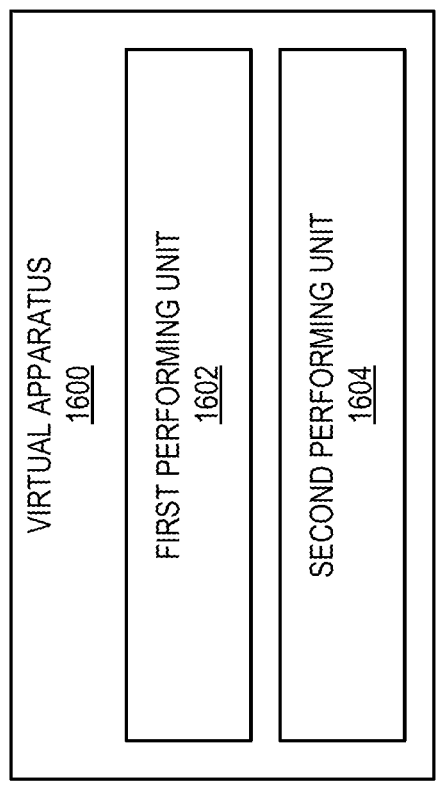
FIG. 16 illustrates a schematic block diagram of an apparatus in a wireless network (for example, the wireless network shown in FIG. 6).

FIG. 16 illustrates a schematic block diagram of an apparatus 1600 in a wireless network (for example, the wireless network shown in FIG. 6). The apparatus may be implemented in a wireless device or network node (e.g., wireless device 610 or network node 660 shown in FIG. 6). Apparatus 1600 is operable to carry out the example method described with reference to FIG. 15 and possibly any other processes or methods disclosed herein. It is also to be understood that the method of FIG. 15 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first performing unit 1602, second performing unit 1604, and any other suitable units of the apparatus 1600 to perform corresponding functions according one or more embodiments of the present disclosure.

As illustrated in FIG. 16, apparatus 1600 includes first performing unit 1602 and second performing unit 1604. The first performing unit 1602 is configured to perform TBS determination in accordance with any embodiment(s) described herein. The second performing unit 1604 is configured to perform transmission using the determined TBS.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some exemplary embodiments are as follows.

Embodiment 1: A method performed by a wireless device, the method comprising: performing a TBS determination procedure to determine a TBS for a (e.g., data channel) transmission; and performing the data channel transmission using the TBS.

Embodiment 2: The method of embodiment 1 wherein performing the TBS determination procedure comprises, for at least one first range of TBSs, determining the TBS for the transmission using a formula that can give rise to codeblocks of unequal size.

Embodiment 3: The method of embodiment 2 wherein performing the TBS determination procedure further comprises, for the at least first one range of TBSs, using filler bits handle any TBSs that give rise to codebooks of unequal size.

Embodiment 4: The method of any one of embodiments 1 to 3 wherein performing the TBS determination procedure comprises, for at least one second range of TBSs, determining the TBS for the transmission using a formula that is designed such that all of some of the TBSs used ensure equal sized codeblocks independent of which base graph is used for codeblock segmentation.

Embodiment 5: The method of embodiment 1 wherein performing the TBS determination procedure comprises, for at least one first range of TBSs, determining the TBS for the transmission as the smallest integer larger than or equal to $TBS_0$ satisfying the following conditions: k is a multiple of 8 and $$(k + L_0) \bmod \left\lceil \frac{k + L_0}{Z_1 - L_1} \right\rceil = 0.$$

Embodiment 6: The method of embodiment 1 wherein performing the TBS determination procedure comprises, for at least one first range of TBSs, determining the TBS for the transmission as the smallest integer larger than or equal to $TBS_0$ satisfying the following conditions: k is a multiple of 8, $$(k + L_0) \bmod \left\lceil \frac{k + L_0}{Z_1 - L_1} \right\rceil = 0, \text{ and } (k + L_2) \bmod \left\lceil \frac{k + L_2}{Z_2 - L_3} \right\rceil = 0.$$

Embodiment 7: The method of embodiment 1 wherein performing the TBS determination procedure comprises, for at least one first range of TBSs, determining the TBS for the transmission as the integer k that satisfies conditions (a) and (b) with smallest absolute difference $|k-TBS_0|$ to $TBS_0$, where: condition (a) is k is a multiple of 8, and condition (b) is $$(k + L_0) \bmod \left\lceil \frac{k + L_0}{Z_1 - L_1} \right\rceil = 0.$$

Embodiment 8: The method of embodiment 1 wherein performing the TBS determination procedure comprises, for at least one first range of TBSs, determining the TBS for the transmission as the integer k that satisfies conditions (a), (b), and (c) with smallest absolute difference $|k-TBS_0|$ to $TBS_0$, where: condition (a) is k is a multiple of 8, condition (b) is $$(k + L_0) \bmod \left\lceil \frac{k + L_0}{Z_1 - L_1} \right\rceil = 0,$$

and condition (c) is $$(k+L_2) \bmod \left\lceil \frac{k+L_2}{Z_2-L_3} \right\rceil = 0.$$

Embodiment 9: The method of any one of embodiments 1 to 8 wherein the wireless device implements only one of BG1 and BG2.

Embodiment 10: The method of any one of embodiments 1 to 9 wherein the transmission is a 5G NR data channel transmission.

Embodiment 11: The method of any of the previous embodiments, further comprising: providing user data; and forwarding the user data to a host computer via the transmission to the base station.

Embodiment 12: A method performed by a base station, the method comprising: performing a TBS determination procedure to determine a TBS for a data channel transmission from the base station to a wireless device; and performing the data channel transmission using the TBS.

Embodiment 13: The method of embodiment 12 wherein performing the TBS determination procedure comprises, for at least one first range of TBSs, determining the TBS for the transmission using a formula that can give rise to codeblocks of unequal size.

Embodiment 14: The method of embodiment 13 wherein performing the TBS determination procedure further comprises, for the at least first one range of TBSs, using filler bits handle any TBSs that give rise to codebooks of unequal size.

Embodiment 15: The method of any one of embodiments 12 to 14 wherein performing the TBS determination procedure comprises, for at least one second range of TBSs, determining the TBS for the transmission using a formula that is designed such that all of some of the TBSs used ensure equal sized codeblocks independent of which base graph is used for codeblock segmentation.

Embodiment 16: The method of embodiment 12 wherein performing the TBS determination procedure comprises, for at least one first range of TBSs, determining the TBS for the transmission as the smallest integer larger than or equal to $TBS_0$ satisfying the following conditions: k is a multiple of 8 and $$(k+L_0) \bmod \left\lceil \frac{k+L_0}{Z_1-L_1} \right\rceil = 0.$$

Embodiment 17: The method of embodiment 12 wherein performing the TBS determination procedure comprises, for at least one first range of TBSs, determining the TBS for the transmission as the smallest integer larger than or equal to $TBS_0$ satisfying the following conditions: k is a multiple of 8, $$(k+L_0) \bmod \left\lceil \frac{k+L_0}{Z_1-L_1} \right\rceil = 0, \text{ and } (k+L_2) \bmod \left\lceil \frac{k+L_2}{Z_2-L_3} \right\rceil = 0.$$

Embodiment 18: The method of embodiment 12 wherein performing the TBS determination procedure comprises, for at least one first range of TBSs, determining the TBS for the transmission as the integer k that satisfies conditions (a) and (b) with smallest absolute difference $|k-TBS_0|$ to $TBS_0$, where: condition (a) is k is a multiple of 8, and condition (b) is $$(k+L_0) \bmod \left\lceil \frac{k+L_0}{Z_1-L_1} \right\rceil = 0.$$

Embodiment 19: The method of embodiment 12 wherein performing the TBS determination procedure comprises, for at least one first range of TBSs, determining the TBS for the transmission as the integer k that satisfies conditions (a), (b), and (c) with smallest absolute difference $|k-TBS_0|$ to $TBS_0$, where: condition (a) is k is a multiple of 8, condition (b) is $$(k+L_0) \bmod \left\lceil \frac{k+L_0}{Z_1-L_1} \right\rceil = 0,$$

and condition (c) is $$(k+L_2) \bmod \left\lceil \frac{k+L_2}{Z_2-L_3} \right\rceil = 0.$$

Embodiment 20: The method of any one of embodiments 12 to 19 wherein the wireless device implements only one of BG1 and BG2.

Embodiment 21: The method of any one of embodiments 12 to 20 wherein the transmission is a 5G NR data channel transmission.

Embodiment 22: The method of any of the previous embodiments, further comprising: providing user data; and forwarding the user data to a host computer via the transmission to the base station.

Embodiment 23: The method of any of the previous embodiments, further comprising: obtaining user data; and forwarding the user data to a host computer or a wireless device.

Embodiment 24: A wireless device, the wireless device comprising: processing circuitry configured to perform any of the steps of any of embodiments 1-11; and power supply circuitry configured to supply power to the wireless device.

Embodiment 25: A base station, the base station comprising: processing circuitry configured to perform any of the steps of any of embodiments 12-23; and power supply circuitry configured to supply power to the wireless device.

Embodiment 26: A UE, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of embodiments 1-11; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 27: A communication system including a host computer comprising: processing circuitry configured to provide user data; and a communication interface configured to forward the user data to a cellular network for transmission to a UE, wherein the cellular network comprises a base station having a radio interface and processing circuitry, the base station's processing circuitry configured to perform any of the steps of any of embodiments 12-23.

Embodiment 28: The communication system of the previous embodiment further including the base station.

Embodiment 29: The communication system of the previous 2 embodiments, further including the UE, wherein the UE is configured to communicate with the base station.

Embodiment 30: The communication system of the previous 3 embodiments, wherein: the processing circuitry of the host computer is configured to execute a host application, thereby providing the user data; and the UE comprises processing circuitry configured to execute a client application associated with the host application.

Embodiment 31: A method implemented in a communication system including a host computer, a base station and a UE, the method comprising: at the host computer, providing user data; and at the host computer, initiating a transmission carrying the user data to the UE via a cellular network comprising the base station, wherein the base station performs any of the steps of any of embodiments 12-23.

Embodiment 32: The method of the previous embodiment, further comprising, at the base station, transmitting the user data.

Embodiment 33: The method of the previous 2 embodiments, wherein the user data is provided at the host computer by executing a host application, the method further comprising, at the UE, executing a client application associated with the host application.

Embodiment 34: A UE configured to communicate with a base station, the UE comprising a radio interface and processing circuitry configured to perform the method of the previous 3 embodiments.

Embodiment 35: A communication system including a host computer comprising: processing circuitry configured to provide user data; and a communication interface configured to forward user data to a cellular network for transmission to a UE, wherein the UE comprises a radio interface and processing circuitry, the UE's components configured to perform any of the steps of any of embodiments 1-11.

Embodiment 36: The communication system of the previous embodiment, wherein the cellular network further includes a base station configured to communicate with the UE.

Embodiment 37: The communication system of the previous 2 embodiments, wherein: the processing circuitry of the host computer is configured to execute a host application, thereby providing the user data; and the UE's processing circuitry is configured to execute a client application associated with the host application.

Embodiment 38: A method implemented in a communication system including a host computer, a base station and a UE, the method comprising: at the host computer, providing user data; and at the host computer, initiating a transmission carrying the user data to the UE via a cellular network comprising the base station, wherein the UE performs any of the steps of any of embodiments 1-11.

Embodiment 39: The method of the previous embodiment, further comprising at the UE, receiving the user data from the base station.

Embodiment 40: A communication system including a host computer comprising: communication interface configured to receive user data originating from a transmission from a UE to a base station, wherein the UE comprises a radio interface and processing circuitry, the UE's processing circuitry configured to perform any of the steps of any of embodiments 1-11.

Embodiment 41: The communication system of the previous embodiment, further including the UE.

Embodiment 42: The communication system of the previous 2 embodiments, further including the base station, wherein the base station comprises a radio interface configured to communicate with the UE and a communication interface configured to forward to the host computer the user data carried by a transmission from the UE to the base station.

Embodiment 43: The communication system of the previous 3 embodiments, wherein: the processing circuitry of the host computer is configured to execute a host application; and the UE's processing circuitry is configured to execute a client application associated with the host application, thereby providing the user data.

Embodiment 44: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 45: A method implemented in a communication system including a host computer, a base station and a UE, the method comprising: at the host computer, receiving user data transmitted to the base station from the UE, wherein the UE performs any of the steps of any of embodiments 1-11.

Embodiment 46: The method of the previous embodiment, further comprising, at the UE, providing the user data to the base station.

Embodiment 47: The method of the previous 2 embodiments, further comprising: at the UE, executing a client application, thereby providing the user data to be transmitted; and at the host computer, executing a host application associated with the client application.

Embodiment 48: The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Embodiment 49: A communication system including a host computer comprising a communication interface configured to receive user data originating from a transmission from a UE to a base station, wherein the base station comprises a radio interface and processing circuitry, the base station's processing circuitry configured to perform any of the steps of any of embodiments 12-23.

Embodiment 50: The communication system of the previous embodiment further including the base station.

Embodiment 51: The communication system of the previous 2 embodiments, further including the UE, wherein the UE is configured to communicate with the base station.

Embodiment 52: The communication system of the previous 3 embodiments, wherein: the processing circuitry of the host computer is configured to execute a host application; the UE is configured to execute a client application associated with the host application, thereby providing the user data to be received by the host computer.

Embodiment 53: A method implemented in a communication system including a host computer, a base station and a UE, the method comprising: at the host computer, receiving, from the base station, user data originating from a transmission which the base station has received from the UE, wherein the UE performs any of the steps of any of embodiments 1-11.

Embodiment 54: The method of the previous embodiment, further comprising at the base station, receiving the user data from the UE.

Embodiment 55: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AC Alternating Current
AP Access Point
ASIC Application Specific Integrated Circuit
ATM Asynchronous Transfer Mode
BS Base Station
BSC Base Station Controller
BTS Base Transceiver Station
CD Compact Disk
CDMA Code Division Multiple Access
COTS Commercial Off-the-Shelf
CPE Customer Premise Equipment
CPU Central Processing Unit
CRC Cyclic Redundancy Check
D2D Device-to-Device
DAS Distributed Antenna System
DC Direct Current
DCI Downlink Control Information
DIMM Dual In-Line Memory Module
DL Downlink
DSP Digital Signal Processor
DVD Digital Video Disk
DwPTS Downlink Pilot Time Slot
EEPROM Electrically Erasable Programmable Read Only Memory
eMTC Enhanced Machine Type Communication
eNB Enhanced or Evolved Node B
EPROM Erasable Programmable Read Only Memory
E-SMLC Evolved Serving Mobile Location Center
FDD Frequency Division Duplexing
FPGA Field Programmable Gate Array
GHz Gigahertz
gNB New Radio Base Station
GPS Global Positioning System
GSM Global System for Mobile Communications
HARQ Hybrid Automatic Repeat Request
HDDS Holographic Digital Data Storage
HD-DVD High-Density Digital Versatile Disc
ID Identity
I/O Input and Output
IoT Internet of Things
IP Internet Protocol
kHz Kilohertz
LAN Local Area Network
LBT Listen-Before-Talk
LDPC Low-Density Parity-Check
LEE Laptop Embedded Equipment
LME Laptop Mounted Equipment
LPDC Low-Parity Density-Check
LTE Long Term Evolution
M2M Machine-to-Machine
MANO Management and Orchestration
MCE Multi-Cell/Multicast Coordination Entity
MCS Modulation and Coding Scheme
MDT Minimization of Drive Tests
MIMO Multiple Input Multiple Output
MME Mobility Management Entity
MSC Mobile Switching Center
MSR Multi-Standard Radio
MTC Machine Type Communication
NB-IoT Narrowband Internet of Things
NFV Network Function Virtualization
NIC Network Interface Controller
NR New Radio
O&M Operation and Maintenance
OFDM Orthogonal Frequency Division Multiplexing
OSS Operations Support System
OTT Over-the-Top
PDA Personal Digital Assistant
PDCCH Physical Downlink Control Channel
PDSCH Physical Downlink Shared Channel
PRB Physical Resource Block
PROM Programmable Read Only Memory
PSTN Public Switched Telephone Networks
PUCCH Physical Uplink Control Channel
QAM Quadrature Amplitude Modulation
QPSK Quadrature Phase Shift Keying
RAID Redundant Array of Independent Disks
RAM Random Access Memory
RAN Radio Access Network
RAT Radio Access Technology
RE Resource Element
RF Radio Frequency
RNC Radio Network Controller
ROM Read Only Memory
RRH Remote Radio Head
RRU Remote Radio Unit
RUIM Removable User Identity
SDRAM Synchronous Dynamic Random Access Memory
SIM Subscriber Identity Module
SOC System on a Chip
SON Self-Organizing Network
SONET Synchronous Optical Networking
TBS Transport Block Size
TCP Transmission Control Protocol
TDD Time Division Duplexing
TPC Transmit Power Control
TRP Transmission-Receive-Point
TS Technical Specification
UE User Equipment
UL Uplink
UMTS Universal Mobile Telecommunications System
USB Universal Serial Bus
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
VRB Virtual Resource Block
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure.

All such improvements and modifications are considered within the scope of the concepts disclosed herein.

The invention claimed is:

1. A method implemented by a wireless device operable in a cellular communications network, the method comprising:
  determining, by processing circuitry of the wireless device, a Transport Block Size (TBS) for a transport block communicated between a network node and the wireless device via a physical downlink shared channel (PDSCH) transmission using a formula such that code block segmentation of the transport block results in equal sized code blocks of a first size for a first Low-Density Parity Code (LDPC) base graph and in equal size codes blocks of a second size for a second LDPC base graph, wherein the first size and the second size are different, and wherein the formula for TBS is X·Y−Z, wherein:
    X is a value that is a function of a number of code blocks C;
    Y is a value resulting from rounding a ratio $Y_{num}/Y_{denom}$, where $Y_{num}$ is a sum of an approximation of the TBS and a number of Cyclic Redundancy Check (CRC) bits attached to each transport block of the PDSCH transmission and $Y_{denom}=X$; and
    Z is the number of CRC bits attached to each transport block of the PDSCH transmission; and
  receiving, by the processing circuitry of the wireless device, the transport block according to the determined TBS.

2. The method of claim 1, wherein the formula is based on a target code rate R for the PDSCH transmission determining the TBS comprises:
  determining that a target code rate R for the PDSCH transmission is less than or equal to ¼; and
  upon determining that R is less than or equal to ¼:
    determining the number of code blocks C for the PDSCH transmission based on the approximation of the TBS, the number of Cyclic Redundancy Check, CRC, bits attached to each transport block of the PDSCH transmission, and a number of CRC bits, if any, attached to each code block of the PDSCH transmission when using the first LDPC base graph for the code block segmentation; and
    determining the TBS for the PDSCH transmission based on the number of code blocks C, the approximation of the TBS, and the number of CRC bits attached to each transport block of the PDSCH transmission.

3. The method of claim 2 wherein determining the number of code blocks C comprises rounding up a ratio A/B to a nearest integer, wherein A is a sum of the approximation of the TBS and the number of CRC bits attached to each transport block of the PDSCH transmission and B is a difference of a maximum code block size for the first LDPC base graph and the number of CRC bits, if any, attached to each code block of the physical channel transmission.

4. The method of claim 2, wherein both the number of CRC bits attached to each transport block of the PDSCH transmission and the number of CRC bits, if any, attached to each code block of the physical channel transmission are equal to 24.

5. The method of claim 1, wherein X is equal to a least common multiple of C and 8.

6. The method of claim 1 wherein determining the TBS comprises:
  determining that a target code rate R for the PDSCH transmission is greater than ¼;
  determining that an approximation of the TBS is greater than a threshold; and
  upon determining that R is greater than ¼ and determining that the approximation of the TBS is greater than the threshold:
    determining a number of code blocks C for the PDSCH transmission based on an approximation of the TBS, a number of Cyclic Redundancy Check, CRC, bits attached to each transport block of the PDSCH transmission, and a number of CRC bits, if any, attached to each code block of the PDSCH transmission when using a first base graph for code block segmentation; and
    determining the TBS for the PDSCH transmission based on the number of code blocks C, the approximation of the TBS, and the number of CRC bits attached to each transport block of the PDSCH transmission.

7. The method of claim 6, wherein determining the number of code blocks C comprises:
  determining the number of code blocks C by rounding up a ratio A/B to a nearest integer;
  wherein A is a sum of the approximation of the TBS and the number of CRC bits attached to each transport block of the PDSCH transmission and B is a difference of a maximum code block size for the first base graph and the number of CRC bits, if any, attached to each code block of the PDSCH transmission.

8. The method of claim 6 wherein both the number of CRC bits attached to each transport block of the physical channel transmission and the number of CRC bits, if any, attached to each code block of the physical channel transmission are equal to 24.

9. The method of claim 1, wherein the TBS is determined using the formula, as a consequence determining that an approximation of the TBS is greater than a predetermined value, and wherein another TBS for another transport block communicated between the network node and the wireless device via another physical channel transmission is determined using a table, as a consequence of determining that an approximation for the another TBS is less than or equal to the predetermined value.

10. The method of claim 9, wherein all consecutive entries $k_l$ and $k_{l+1}$ in the table have values such that $$\frac{k_l}{k_{l+1}}$$

is less than or equal to a predetermined value.

11. The method of claim 9, wherein all entries (k) in the table satisfy the following conditions:
  k is a multiple of 8, $$(k+M_0) \bmod \left\lceil \frac{k+M_0}{Z_1-M_1} \right\rceil = 0, \text{ and } (k+M_2) \bmod \left\lceil \frac{k+M_2}{Z_2-M_3} \right\rceil = 0,$$

where $M_0$ is the number of CRC bits attached to the transport block if the first LDPC base graph is used, $Z_1$ is a predetermined maximum TBS for a first one of the two different LDPC base graphs, $M_1$ is a number of CRC bits attached to each code block after segmentation if a number of code blocks is greater than 1 and the first LDPC base graph is used, $M_2$ is a number of CRC bits attached to the transport block if the second LDPC base graph is used, $Z_2$ is is a maximum TBS for a second one of the two different LDPC base graphs, and $M_3$ is a number of CRC bits attached to each code block after segmentation if the number of code blocks is greater than 1 and the second LDPC base graph is used.

12. A method implemented by a wireless device operable in a cellular communications network, the method comprising:
   determining a Transport Block Size (TBS) for a transport block communicated between a network node and the wireless device via a physical downlink shared channel (PDSCH) transmission using a formula such that code block segmentation of the transport block results in equal sized code blocks independent of which of two different Low-Density Parity Code (LDPC) base graphs is used, wherein the formula is based on a number of code blocks C, an approximation of the TBS, and a number of CRC bits attached to each transport block of the PDSCH transmission, and the formula for determining the TBS is X·Y−Z, wherein:
      X is a value that is a function of C;
      Y is a value resulting from rounding a ratio $Y_{num}/Y_{denom}$ to a nearest integer, where $Y_{num}$ is a sum of the approximation of the TBS and the number of CRC bits attached to each transport block of the physical channel transmission and $Y_{denom}=X$; and
      Z is the number of CRC bits attached to each transport block of the PDSCH transmission; and
   receiving the transport block according to the determined TBS.

13. The method of claim 12 wherein X is equal to the least common multiple of C and 8.

14. A wireless device operable in a cellular communications network, wireless device comprising:
   a transmitting and a receiver in communication with a processing device, wherein the processing device is configured to:
   determine a Transport Block Size (TBS) for a transport block communicated between a network node and the wireless device via a physical downlink shared channel (PDSCH) transmission using a formula such that code block segmentation of the transport block results in equal sized code blocks of a first size for a first Low-Density Parity Code (LDPC) base graph and in equal size codes blocks of a second size for a second LDPC base graph, wherein the first size and the second size are different, and wherein the formula for TBS is X·Y−Z, wherein:
      X is a value that is a function of the number of code blocks C;
      Y is a value resulting from rounding a ratio $Y_{num}/Y_{denom}$, where $Y_{num}$ is the sum of an approximation of the TBS and a number of CRC bits attached to each transport block of the PDSCH transmission and $Y_{denom}=X$; and
      Z is the number of CRC bits attached to each transport block of the PDSCH transmission; and
   receive or receive the transport block according to the determined TBS.

15. The wireless device of claim 14, wherein the formula is based on a target code rate R for the PDSCH transmission determining the TBS comprises:
   determining that a target code rate R for the PDSCH transmission is less than or equal to ¼; and
   upon determining that R is less than or equal to ¼:
      determining the number of code blocks C for the PDSCH transmission based on the approximation of the TBS, the number of Cyclic Redundancy Check, CRC, bits attached to each transport block of the PDSCH transmission, and a number of CRC bits, if any, attached to each code block of the PDSCH transmission when using a first base graph for the code block segmentation; and
      determining the TBS for the PDSCH transmission based on the number of code blocks C, the approximation of the TBS, and the number of CRC bits attached to each transport block of the PDSCH transmission.

16. The wireless device of claim 14, wherein X is equal to a least common multiple of C and 8.

17. The wireless device of claim 14, further comprising determining the number of code blocks C by rounding up a ratio A/B to a nearest integer, wherein A is a sum of the approximation of the TBS and the number of CRC bits attached to each transport block of the PDSCH transmission and B is a difference of a maximum code block size for the first base graph and the number of CRC bits, if any, attached to each code block of the PDSCH transmission.

* * * * *